US010248007B2

(12) United States Patent
Kubotera et al.

(10) Patent No.: US 10,248,007 B2
(45) Date of Patent: Apr. 2, 2019

(54) MOUNTING DEVICE AND IMAGING UNIT

(71) Applicant: SONY CORPORATION, Tokyo (JP)

(72) Inventors: Tomoyuki Kubotera, Tokyo (JP);
Masahide Furukawa, Tokyo (JP);
Akihiro Baba, Kanagawa (JP);
Tsuyoshi Umemura, Kanagawa (JP);
Tomotsugu Minamikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 15/303,168

(22) PCT Filed: Mar. 10, 2015

(86) PCT No.: PCT/JP2015/001287
§ 371 (c)(1),
(2) Date: Oct. 10, 2016

(87) PCT Pub. No.: WO2015/173997
PCT Pub. Date: Nov. 19, 2015

(65) Prior Publication Data
US 2017/0031235 A1 Feb. 2, 2017

(30) Foreign Application Priority Data

May 16, 2014 (JP) ................. 2014-102714
Jun. 11, 2014 (JP) ................. 2014-120814

(51) Int. Cl.
G03B 17/56 (2006.01)
G03B 17/04 (2006.01)
(Continued)

(52) U.S. Cl.
CPC ........... *G03B 17/561* (2013.01); *G03B 17/04* (2013.01); *G03B 17/566* (2013.01);
(Continued)

(58) Field of Classification Search
CPC ............... H04N 5/2252; H04N 5/2253; H04N 5/23206; H04N 5/23293; G03B 17/561;
(Continued)

(56) References Cited

U.S. PATENT DOCUMENTS 5,119,203 A 6/1992 Hosaka et al.
5,659,361 A 8/1997 Jin
(Continued)

FOREIGN PATENT DOCUMENTS

EP 0 671 849 A1 9/1995
JP 1-125435 U 8/1989
(Continued)

OTHER PUBLICATIONS

Extended European Search Report dated Sep. 12, 2017 in Patent Application No. 15793156.9.
(Continued)

Primary Examiner — Yogesh K Aggarwal
(74) Attorney, Agent, or Firm — Oblon, McClelland, Maier & Neustadt, L.L.P.

(57) ABSTRACT

There are provided a mounting device and an imaging unit through which it is possible to easily perform various imaging techniques with an imaging device that cooperates with an information processing device according to cooperation between the devices. Provided is a mounting device that enables an imaging device configured to transmit an image to an external display device to be detachable from an external device, the mounting device including: a first mounting portion configured to be mounted on the imaging device; a second mounting portion configured to be mounted on the external device; and a rotation mechanism through which the first mounting portion and the second mounting portion are rotatable.

18 Claims, 38 Drawing Sheets

(51) Int. Cl.
*H04N 5/225* (2006.01)
*H04N 5/232* (2006.01)

(52) U.S. Cl.
CPC ......... *H04N 5/2252* (2013.01); *H04N 5/2253* (2013.01); *H04N 5/23206* (2013.01); *H04N 5/23293* (2013.01); *G03B 2206/00* (2013.01)

(58) Field of Classification Search
CPC ... G03B 17/04; G03B 17/566; G03B 2206/00
See application file for complete search history.

(56) References Cited

U.S. PATENT DOCUMENTS

| | | | | |
|---|---|---|---|---|
| 7,206,024 | B2* | 4/2007 | Tsukahara | H04N 5/2252 |
| | | | | 348/373 |
| 2008/0180568 | A1* | 7/2008 | Ohnishi | G03B 17/02 |
| | | | | 348/376 |
| 2010/0060747 | A1 | 3/2010 | Woodman | |
| 2012/0224078 | A1 | 9/2012 | Woodman | |
| 2013/0057758 | A1 | 3/2013 | Woodman | |
| 2013/0107101 | A1 | 5/2013 | Akiyama | |
| 2013/0235167 | A1* | 9/2013 | Izawa | G03B 35/24 |
| | | | | 348/51 |
| 2014/0104447 | A1 | 4/2014 | Woodman | |
| 2016/0014318 | A1* | 1/2016 | Okabe | G03B 17/02 |
| | | | | 348/207.1 |
| 2016/0309064 | A1 | 10/2016 | Woodman | |
| 2016/0373623 | A1 | 12/2016 | Woodman | |

FOREIGN PATENT DOCUMENTS

| | | |
|---|---|---|
| JP | 8-23466 A | 1/1996 |
| JP | 8-331434 A | 12/1996 |
| JP | 2009-69564 A | 4/2009 |
| JP | 2013-17758 A | 1/2013 |
| JP | 2013-165373 A | 8/2013 |
| JP | 3190001 U | 4/2014 |
| WO | 2013/129316 A1 | 9/2013 |

OTHER PUBLICATIONS

International Search Report dated Jun. 9, 2015 in PCT/JP2015/001287 filed Mar. 10, 2015.

* cited by examiner

FIG. 4
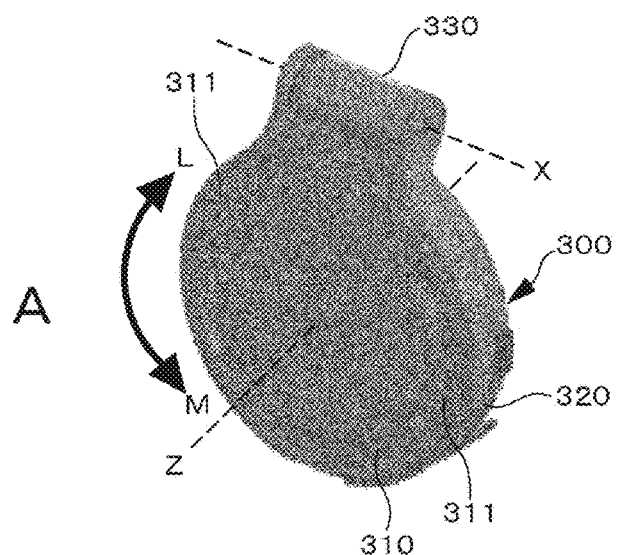
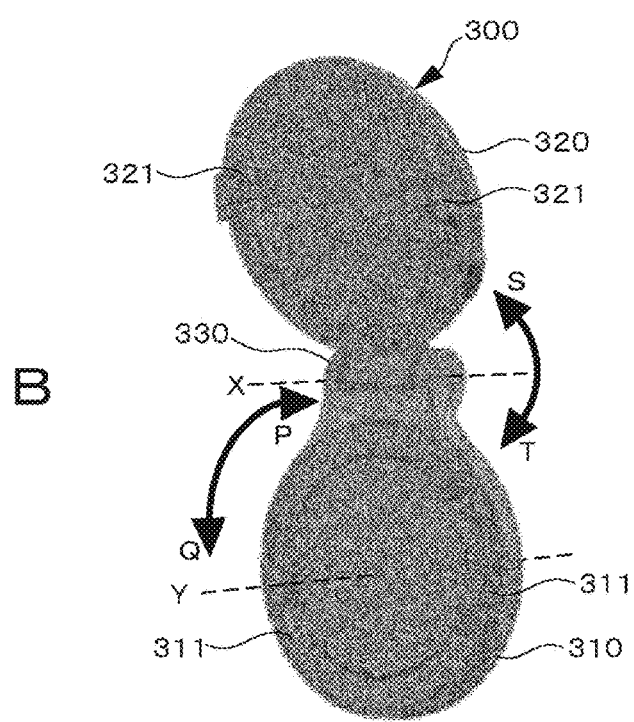

FIG. 7
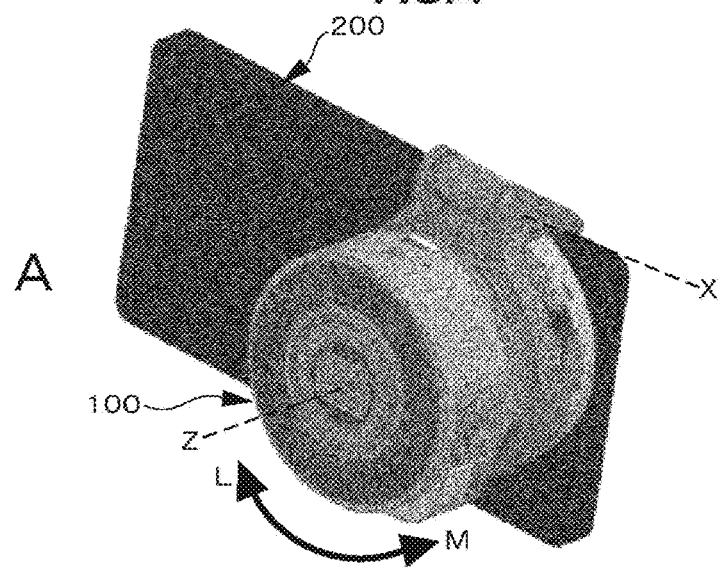
A
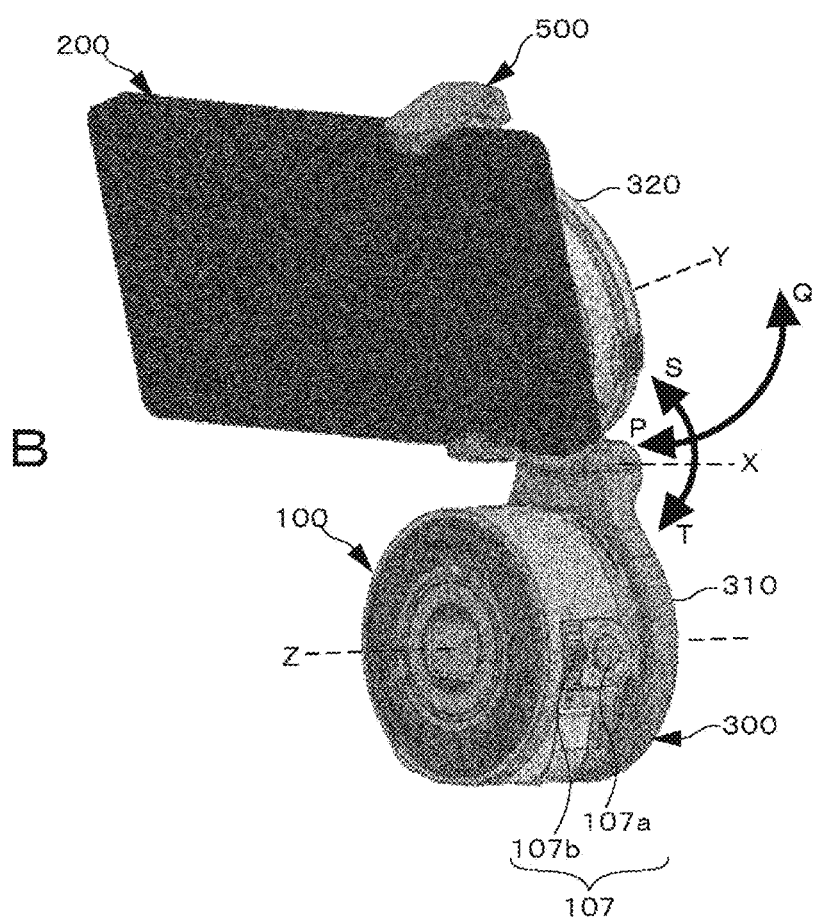
B

FIG. 10
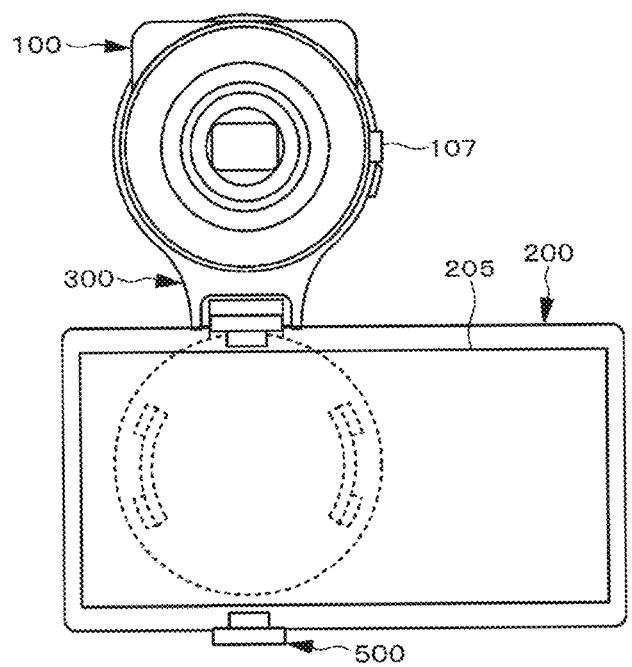
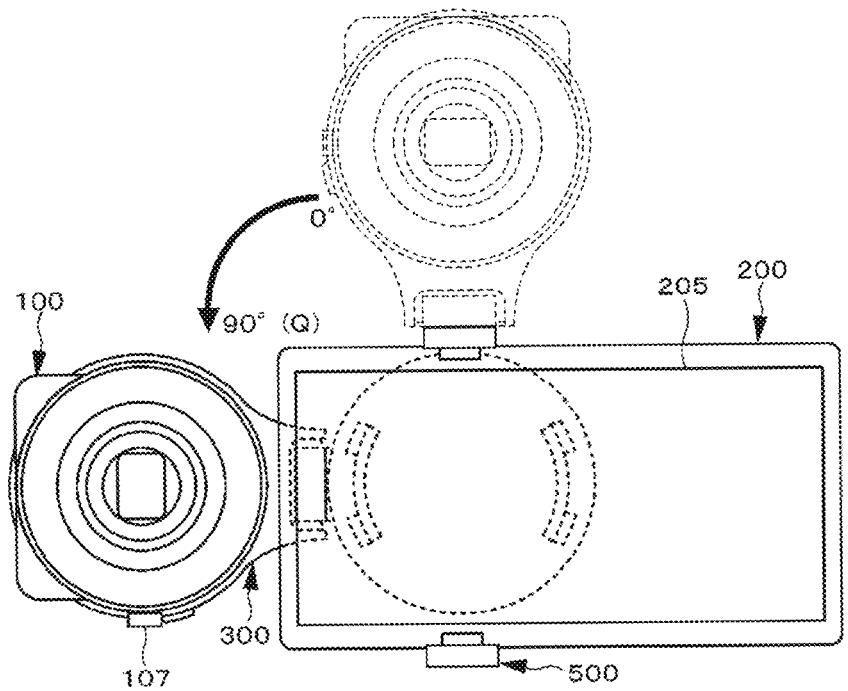

FIG. 18
A
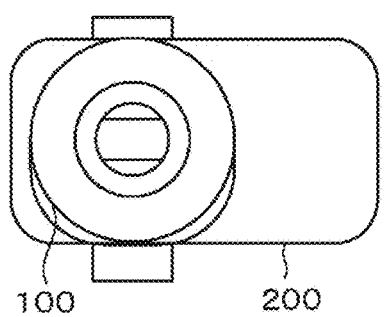
B
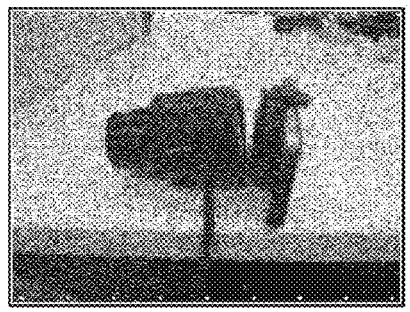
C
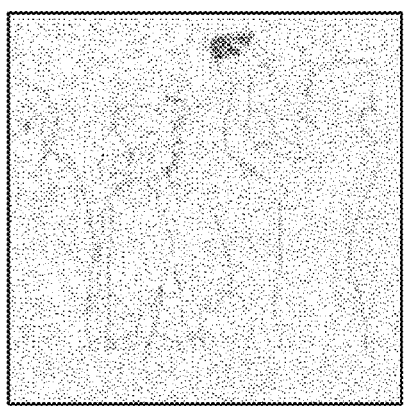
D
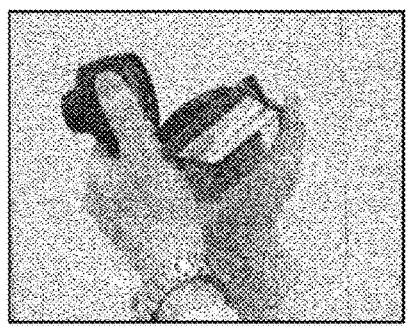
E
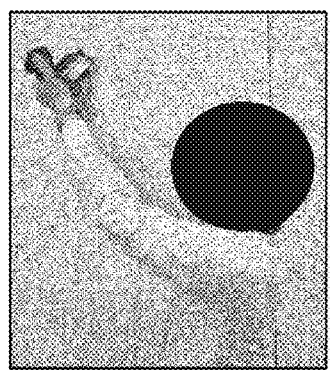

FIG. 19
A
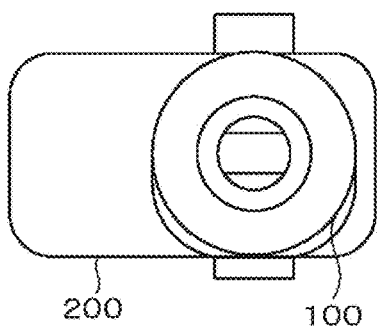
B
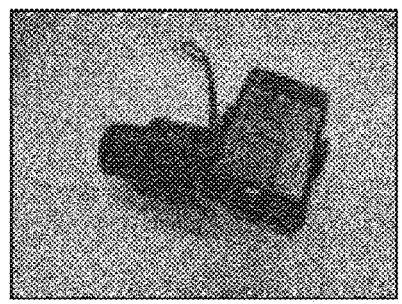
C
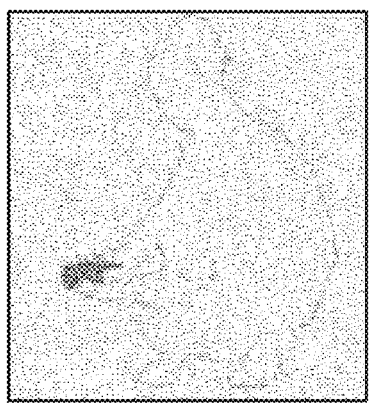
D
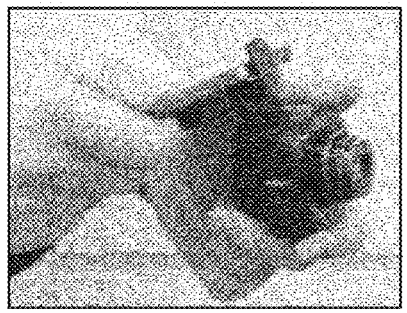
E
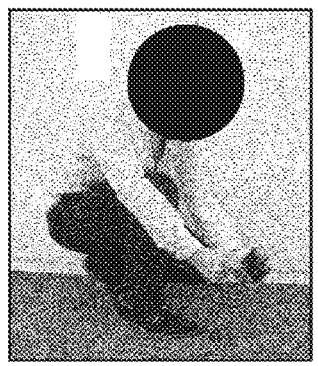

FIG. 20
A
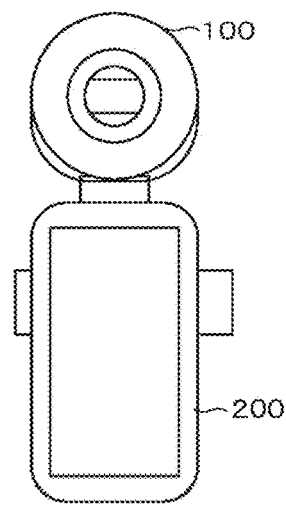
B
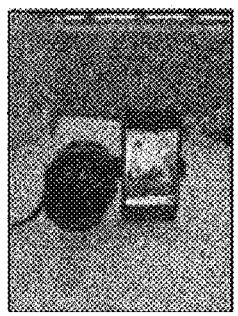
C
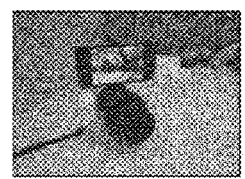
D
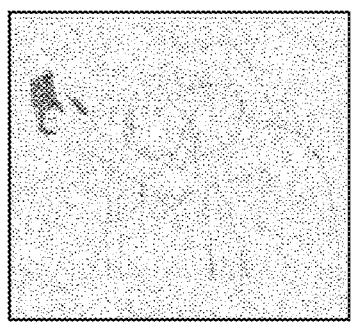
E
F

FIG. 35
A
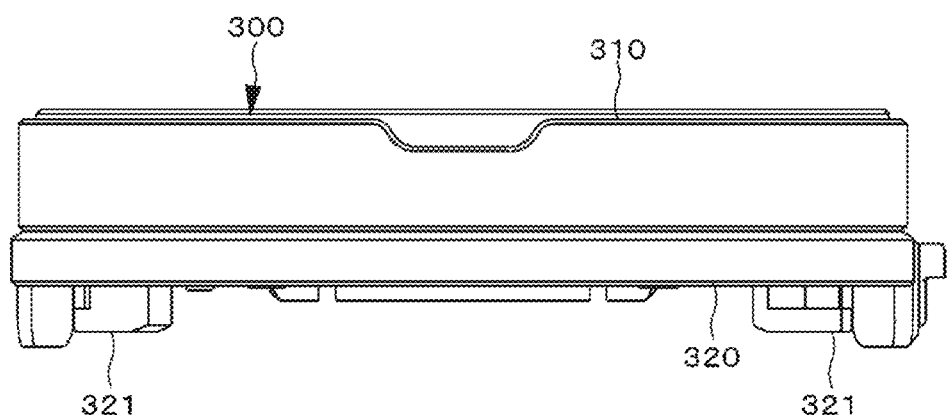
B
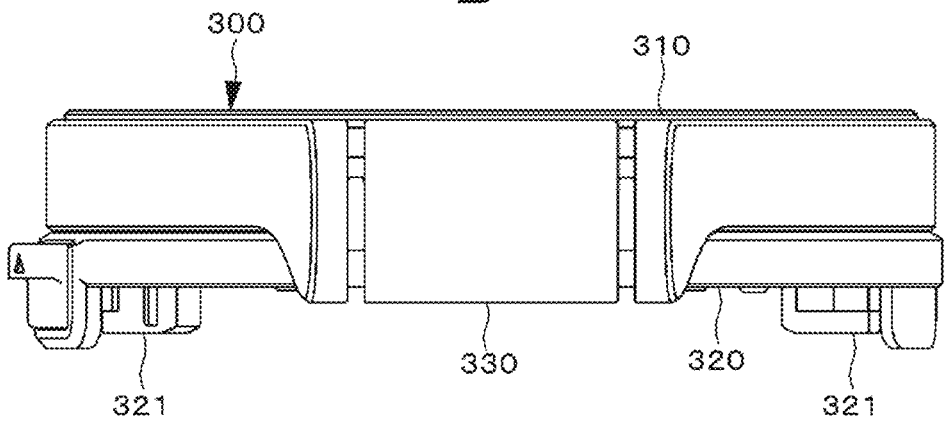

MOUNTING DEVICE AND IMAGING UNIT

TECHNICAL FIELD

The present technology relates to a mounting device and an imaging unit.

BACKGROUND ART

Video camera devices having a remote control function have been proposed in the past. For example, a video camera device in which imaging is performed according to an imaging signal transmitted from a remote controller via wireless communication and a captured image is transmitted to a remote controller side has been proposed (Patent Literature 1).

In addition, a system configured to perform remote imaging control of a digital camera using an information processing device (for example, a smartphone or a mobile phone terminal) that wirelessly communicates with the digital camera and in which an application having an imaging controllable function in remote is implemented has been proposed.

CITATION LIST

Patent Literature

Patent Literature 1 JP H8-331434A

SUMMARY OF INVENTION

Technical Problem

In this manner, in cooperation with an information processing device such as a smartphone, in order for various imaging techniques, for example, a so-called selfie in which a photographer captures an image of the photographer himself or herself, to be easily performed, more convenience of use is necessary.

In view of such circumstances, the present technology provides a mounting device and an imaging unit through which it is possible to easily perform imaging at various imaging positions with various imaging techniques by an imaging device that cooperates with an information processing device.

Solution to Problem

In order to solve the above problem, a first technology is a mounting device that enables an imaging device configured to transmit an image to an external display device to be detachable from an external device, the mounting device including: a first mounting portion configured to be mounted on the imaging device; a second mounting portion configured to be mounted on the external device; and a rotation mechanism through which the first mounting portion and the second mounting portion are rotatable.

A second technology is an imaging unit including: an imaging portion; a first mounting portion configured to be mounted on the imaging portion; a second mounting portion configured to be mounted on an external device; and a rotation mechanism through which the first mounting portion and the second mounting portion are rotatable.

Advantageous Effects of Invention

According to the present technology, it is possible to easily perform imaging at various imaging positions with various imaging techniques by an imaging device that cooperates with an information processing device.

BRIEF DESCRIPTION OF DRAWINGS

FIG. 4A is an exterior perspective view when a mounting device is closed and FIG. 4B is an exterior perspective view when a mounting device is open.

FIG. 7A is a perspective view when an imaging device is mounted in an information processing device and a hinge mechanism is closed. FIG. 7B is a perspective view when an imaging device is mounted in an information processing device and a hinge mechanism is open.

FIG. 10A is a diagram showing a rotational movement of a second rotation mechanism. FIG. 10C is a diagram showing a rotational movement of a second rotation mechanism.

FIG. 13B is a perspective view of a hinge mechanism.

FIG. 18A and FIG. 18B are diagrams showing states in which a lens of an imaging device and a display unit of an information processing device face in different directions.

FIG. 18C, FIG. 18D, and FIG. 18E show aspects when so-called high angle imaging is performed.

FIG. 19A and FIG. 19B are diagrams showing states in which a lens of an imaging device and a display unit of an information processing device face in different directions. FIG. 19C, FIG. 19D, and FIG. 19E show aspects when so-called low angle imaging is performed.

FIG. 20A, FIG. 20B and FIG. 20C are diagrams showing states in which a lens of an imaging device and a display unit of an information processing device face in the same direction. FIG. 20D, FIG. 20E and FIG. 20F show aspects when a so-called selfie is performed.

FIG. 35A and FIG. 35B are side views of a mounting device.

DESCRIPTION OF EMBODIMENT(S)

Embodiments of the present technology will be described below with reference to the drawings. The description will proceed in the following order.

<1. Embodiment>
[1-1. Configuration of imaging system]
[1-2. Configuration of imaging device]
[1-3. Configuration of information processing device]
[1-4. Configuration of mounting device]
[1-5. Operation of mounting device]
<2. Modification example.>

1. EMBODIMENT

[1-1. Configuration of Imaging System]

Figure 1:
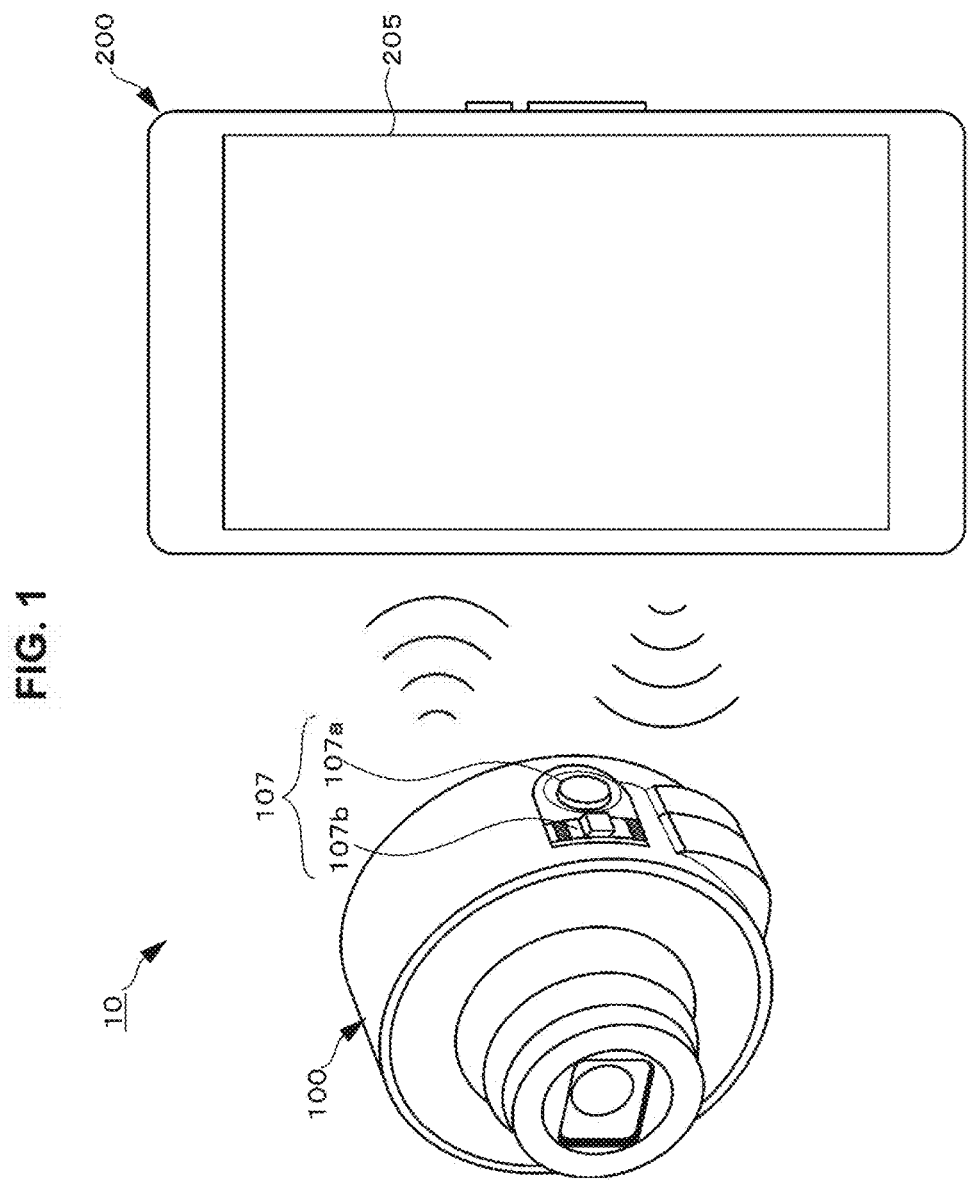
FIG. 1 is a diagram showing an overview of an imaging system including an imaging device and an information processing device.

First, an imaging system 10 according to the present technology will be described. FIG. 1 is a diagram showing an overview of the imaging system 10. The imaging system 10 includes an imaging device 100 and an information processing device 200. Examples of the imaging device 100 include a so-called digital camera. Examples of the information processing device 200 include a smartphone having a camera function. However, the imaging device 100 and the information processing device 200 are not limited thereto. The imaging system 10 is established in cooperation between the imaging device 100 and the information processing device 200.

The imaging device 100 and the information processing device 200 both include a near field communication (NFC) function, and perform non-contact communication with a device that approaches through NFC communication. Using the NFC communication function of the imaging device 100 and the information processing device 200, radio waves that mach a short distance of about 3 cm to 10 cm are transmitted front an NFC antenna and NFC communication is performed between devices included in a range that the radio waves reach.

When the imaging device 100 is in a power off state, if the information processing device 200 approaches, the imaging device 100 is powered on according to NFC communication to be activated. Then, the imaging device 100 performs connection of wireless communication such as Wireless Fidelity (Wi-Fi) in response to a request from the information processing device 200 and a predetermined application is activated on the information processing device 200 side. A cooperation function of the imaging device 100 and the information processing device 200 is performed.

In the present embodiment, the imaging device 100 is mounted on the information processing device 200 using a mounting device 300 and an attachment device 500.

[1-2. Configuration of Imaging Device]

Figure 2:
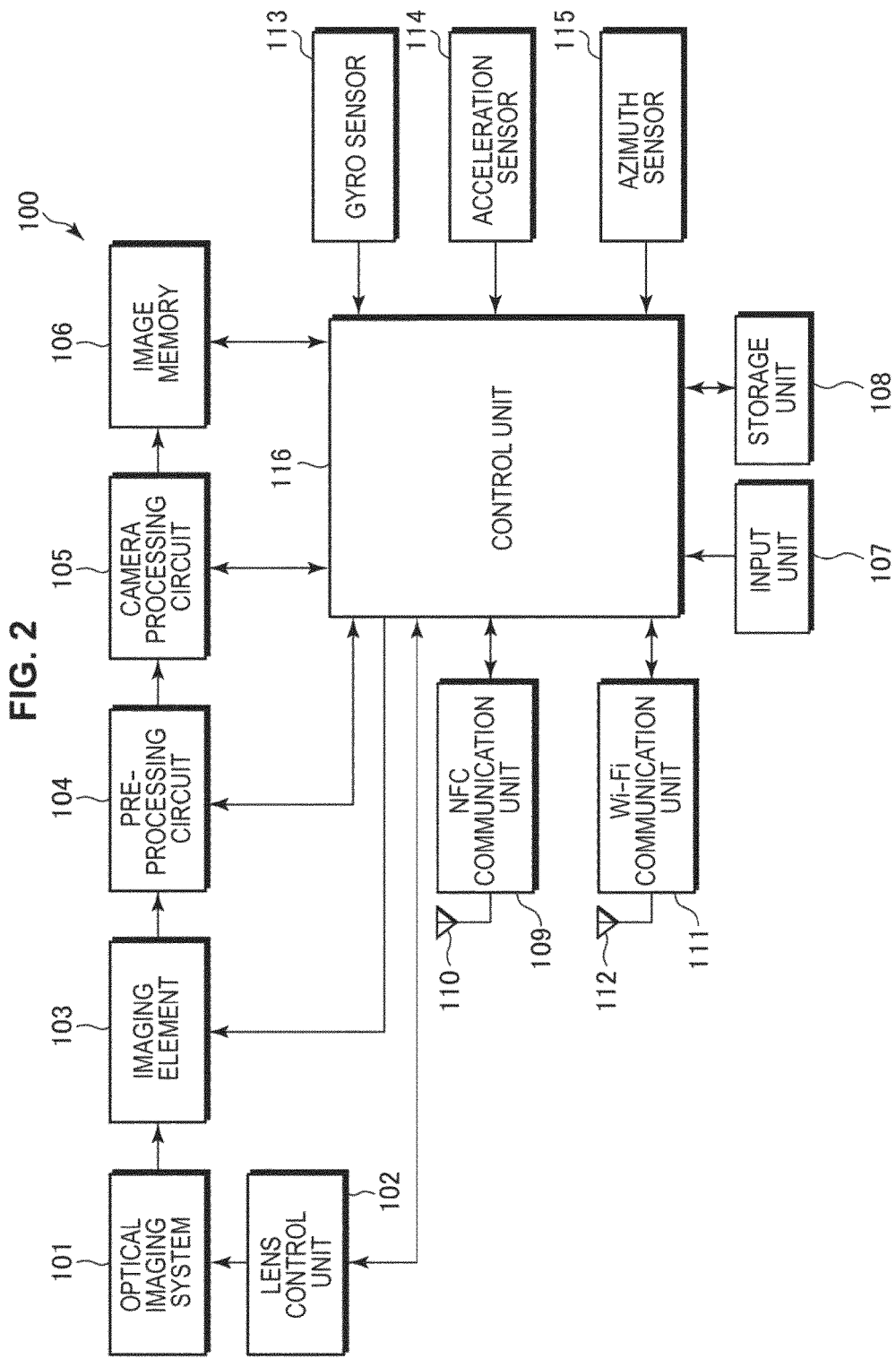
FIG. 2 is a block diagram showing a configuration of an imaging device.

First, the imaging device 100 of the imaging system 10 according to a first embodiment will be described. FIG. 2 is a block diagram showing a configuration of the imaging device 100.

The imaging device 100 includes an optical imaging system 101, a lens control unit 102, an imaging element 103, a preprocessing circuit 104, a camera processing circuit 105, an image memory 106, a manipulation unit 107, a storage unit 108, an NFC communication unit 109, an NFC antenna 110, a Wi-Fi communication unit 111, a Wi-Fi antenna 112, a gyro sensor 113, an acceleration sensor 114, an azimuth sensor 115, and a control unit 116.

The optical imaging system 101 includes an imaging lens configured to collect light from a subject at the imaging element 103, a drive mechanism configured to perform focusing and zooming by moving the imaging lens, a shutter mechanism, and an iris mechanism. These components are driven under control of the lens control unit 102. An optical image of a subject obtained through the optical imaging system 101 is formed on the imaging element 103.

The lens control unit 102 controls operations of the drive mechanism, the shutter mechanism, and the iris mechanism of the optical imaging system 101 under control of the control unit 116. Accordingly, an exposure time (a shutter speed) is adjusted and an aperture value (an F value) is adjusted.

The imaging element 103 photoelectrically converts incident light from a subject into a charge amount, and outputs the result as an analog imaging signal. The analog imaging signal output from the imaging element 103 is output to the pre-processing circuit 104. A charge coupled device (CCD), a complementary metal oxide semiconductor (CMOS) or the like is used as the imaging element 103.

The pre-processing circuit 104 performs sample bold through which a signal/noise (S/N) ratio is favorably maintained by performing a correlated double sampling (CDS) process on the imaging signal output from the imaging element 103. In addition, a gain is controlled by an auto gain control (AGC) process, and a digital image signal obtained by analog/digital (A/D) Conversion is output. Such processes are performed under control of the control unit 116.

The camera processing circuit 105 performs a signal process of the image signal from the pre-processing circuit 104, for example, a white balance adjustment process, a color correction process, a gamma correction process, a Y/C conversion process, and an auto exposure (AE) process.

The image memory 106 is a volatile memory, for example, a buffer memory including a dynamic random access memory (DRAM). The image memory 106 temporarily stores image data that has undergone predetermined processing by the pre-processing circuit 104 and the camera processing circuit 105.

In the present embodiment, the manipulation unit 107 includes a release button 107a for instructing recording of an image to start and a zoom lever 107b for zoom adjustment. When an input is performed on the manipulation unit 107, a control signal corresponding to the input is generated and output to the control unit 116. Then, the control unit 116 performs arithmetic processing or control on the control signal.

In the present embodiment, the release button 107a and the zoom lever 107b are provided adjacent to each other on a side surface of the imaging device. When the release button 107a and the zoom lever 107b are provided adjacent to each other, it is possible to manipulate the release button 107a and the zoom lever 107b with one finger. In addition, it is not necessary to move a finger very much, which improves operability.

In addition, in the imaging device, a power button (not shown) for switching power on-off of the imaging device is provided.

The storage unit 108 is a mass storage medium, for example, a hard disk, a Memory Stick (registered trademark of Sony Corporation), and an SD memory card. The image is stored in a state compressed based on standards such as Joint Photographic Experts Group (JPEG). In addition, exchangeable image file format (EXIF) data including information about a stored image and additional information such as an imaging date and time is stored in associated with the image.

The NFC communication unit 109 is an interface configured to perform non-contact communication with an external device (such as the information processing device 200 in the present technology) that approaches in cooperation with the NFC antenna 110 under control of the control unit 116. The NFC communication unit 109 transmits radio waves that reach a short distance of about 3 cm to 10 cm from the NFC antenna 110 and performs NFC communication with the external device within a range that the radio waves reach.

For example, the NFC communication unit 109 transmits connection information (Wi-Fi configuration) for performing automatic connection of Wi-Fi and an Android application record (AAR) in response to a check command from the external device. The Wi-Fi configuration includes a service set identifier (SSID), a PassKey (encryption key) and the like for Wi-Fi connection.

The Wi-Fi communication unit 111 is an interface configured to perform wireless communication with a surrounding external device in cooperation with the Wi-Fi antenna 112 under control of the control unit 116.

For example, the Wi-Fi communication unit 111 performs Wi-Fi authentication in response to a Wi-Fi connection request from the external device, and performs a Wi-Fi communication connection establishment process with the external device.

The gyro sensor 113 detects a changing speed (an angular velocity) of an angle of rotation and an angular velocity in a Y axis direction when the imaging device 100 is turning and outputs the result to the control unit 116. The acceleration sensor 114 is, for example, a 2-axis or 3-axis acceleration sensor. The acceleration sensor 114 detects a magnitude of vibration that directly or indirectly occurs in the imaging device 100 as an acceleration and outputs the detected result as a vibration signal to the control unit 116.

The azimuth sensor 115 is a sensor that detects the magnetism of the Earth to measure an orientation on the Earth and outputs the measured orientation to the control unit 116. For example, the azimuth sensor 115 is a magnetic sensor including coils with two axes that are perpendicular to each other, and a magnetic resistance (MR) element arranged at the central portion.

The imaging device 100 includes the gyro sensor 113, the acceleration sensor 114 and the azimuth sensor 115, and can usually obtain information such as a position, an orientation, and a slope of the imaging device 100.

The control unit 116 includes a central processing unit (CPU), a random access memory (RAM) and a read only memory (ROM). The ROM stores programs that are read and executed by the CPU. The RAM is used as a work memory of the CPU. The CPU performs various processes according to a program stored in the ROM and provides a command, and thus controls the entire imaging device 100.

The imaging device 100 according to the first embodiment is configured in this manner. Alternatively, the imaging device 100 may be a device other than the digital camera having a camera function, for example, a mobile phone, a smartphone, a portable music player, or a tablet terminal.

[1-3. Configuration of Information Processing Device]

Figure 3:
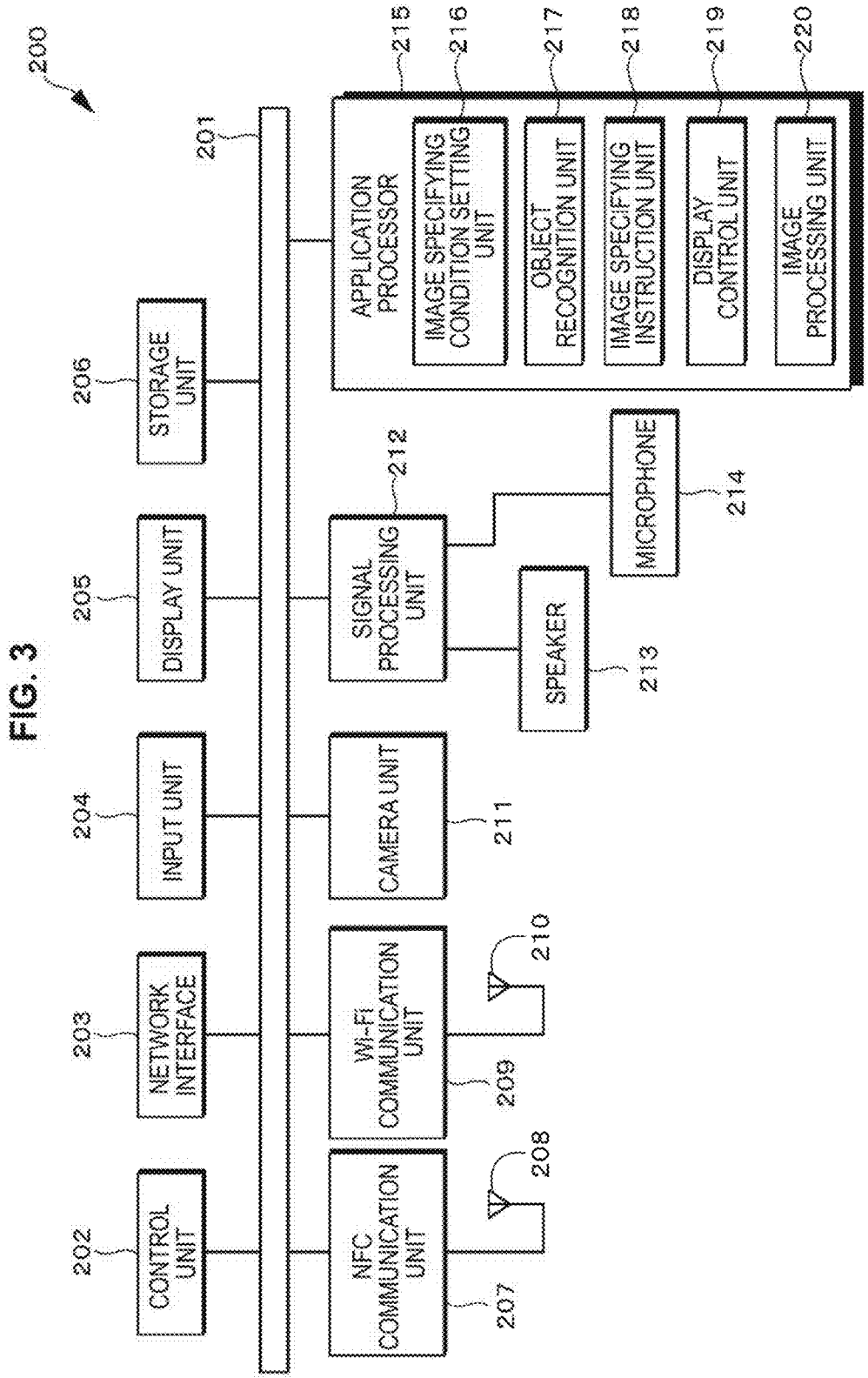
FIG. 3 is a block diagram showing a configuration of an information processing device.

Next, a configuration of the information processing device 200 of the imaging system 10 according to the first embodiment will be described. FIG. 3 is a block diagram showing a configuration of the information processing device 200.

The information processing device 200 includes a data bus 201, a control unit 202, a network interface 203, a manipulation unit 204, a display unit 205, a storage unit 206, an NFC communication unit 207, an NFC antenna 208, a Wi-Fi communication unit 209, a Wi-Fi antenna 210, a camera unit 211, a signal processing unit 212, a speaker 213, a microphone 214 and an application processor 215.

The control unit 202 includes, for example, a CPU, a RAM and a ROM. The ROM stores programs that are read and executed by the CPU. The RAM is used as a work memory of the CPU. The CPU performs various processes according to a program stored in the ROM and thus controls each unit and the whole of the information processing device 200.

The network interface 203 transmits and receives data to and from an external base station based on, for example, a predetermined protocol. Examples of communication schemes include a wireless local area network (LAN), a 3G network, and Long Term Evolution (LTE). Through communication in the network interface 203, a user can perform Internet connection and call another user with the information processing device 200.

The manipulation unit 204 is a manipulation unit configured for a user to perform various inputs to the information processing device 200. For example, the manipulation unit 204 includes a touch screen, a button, and a switch that are integrally formed with the display unit 205. When the user performs an input manipulation on the manipulation unit 204, a control signal corresponding to the input is generated and output to the control unit 202. Then, the control unit 202 performs arithmetic processing and control according to the control signal.

The display unit 205 is a display portion including, for example, a liquid crystal display (LCD), a plasma display panel (PDP), and an organic electro luminescence (EL) panel. A home screen, image content, video content, and various application screens of the information processing device 200 are displayed on the display unit 205.

The storage unit 206 includes a mass storage medium, for example, a hard disc drive (HDD) or a flash memory. The storage unit 206 stores an operating system (OS) configured to control the information processing device 200, application data, and various types of content data. In addition, in the present embodiment, a captured image obtained by capturing of the imaging device 100 is transmitted to the information processing device 200 and stored in the storage unit 206.

The NFC communication unit 207 is an interface configured to perform non-contact communication with an external device (such as the imaging device 100 in the present technology) that approaches in cooperation with the NFC antenna 208 under control of the control unit 202.

The Wi-Fi communication unit 209 is an interface configured to perform wireless communication with a surrounding external device (such as the imaging device 100 in the present technology) in cooperation with the Wi-Fi antenna 210 under control of the control unit 202.

The camera unit 211 is a camera module capable of capturing a still image and a moving image. The camera unit 211 has the same imaging function as the imaging device 100 described above. The above description of the imaging device 100 will be used for describing a configuration of the camera unit 211, and details thereof will be omitted.

The signal processing unit 212 includes a modem, an AD/DA converter, and an audio codec (not shown). The modem of the signal processing unit 212 modulates an audio signal to be transmitted or demodulates a received signal. The signal to be transmitted is converted into a digital signal in the AD/DA convener and the received signal is converted into an analog signal in the AD/DA converter. Then, the speaker 213 configured to output audio and the microphone 214 configured to input audio are connected to the signal processing unit 212.

The speaker 213 is an audio output unit configured to output audio, and outputs an audio signal that has undergone predetermined processing by the signal processing unit 212 as audio. Accordingly, the user can hear call audio and audio data stored in the information processing device 200. In addition, the microphone 214 is a unit configured to input audio for a call and an instruction input according to audio to the information processing device 200. The audio input from the microphone 214 is subjected to predetermined processing by the signal processing unit 212.

The application processor 215 is a processing unit configured to execute various applications installed in the information processing device 200. When the information processing device 200 and the imaging device are used in cooperation, an imaging assistance application for cooperation is executed in the application processor 215.

The imaging assistance application that is installed in the information processing device 200 in advance may he provided to the user or may be installed in the information processing device 200 by the user himself or herself. The imaging assistance application is provided or sold through, for example, an application sales site or all application download service on the Internet. In addition, the imaging assistance application may be provided or sold through a portable recording medium such as an optical disc and a semiconductor memory in which the imaging assistance application is recorded.

The information processing device 200 is configured as described above. When the information processing device 200 is a smartphone, it has an exterior shape shown in, for example, FIG. 1. In the present embodiment, a smartphone having such an elongated rectangular shape in a plan view is used as the information processing device 200, long sides on the left and right are referred to as side surface sides and short sides on the top and bottom are referred to as an upper surface side and a bottom surface side.

The information processing device 200 is an example of a display device in the appended claims. Alternatively, the information processing device 200 may be a device other than the smartphone, for example, a mobile phone, a portable music player, a tablet terminal, or a personal computer.

[1-4. Configuration of Mounting Device]

Figure 5:
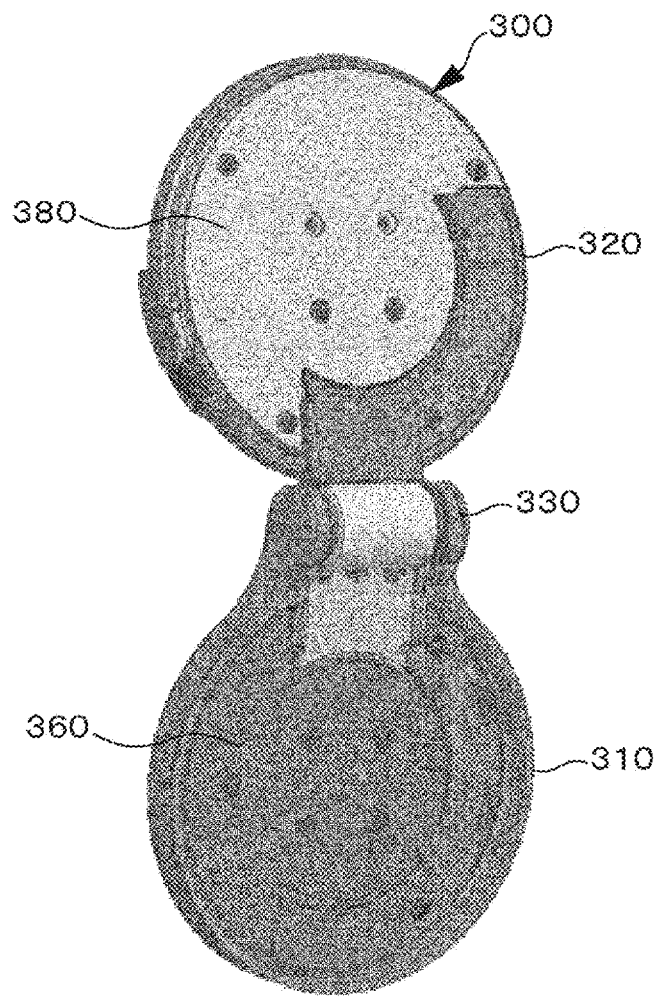
FIG. 5 is a diagram showing an inner surface side while a hinge mechanism of a mounting device is open.

Next, a configuration of the mounting device 300 used when the imaging device 100 is mounted on the information processing device 200 will be described. FIG. 4A is an exterior perspective view when the mounting device 300 is closed. FIG. 4B is an exterior perspective view when the mounting device 300 is open. Furthermore, FIG. 5 is a diagram showing a surface opposite to a side shown in FIG.

4B when the mounting device 300 is open. The mounting device 300 can be opened and closed by a hinge.

Figure 6:
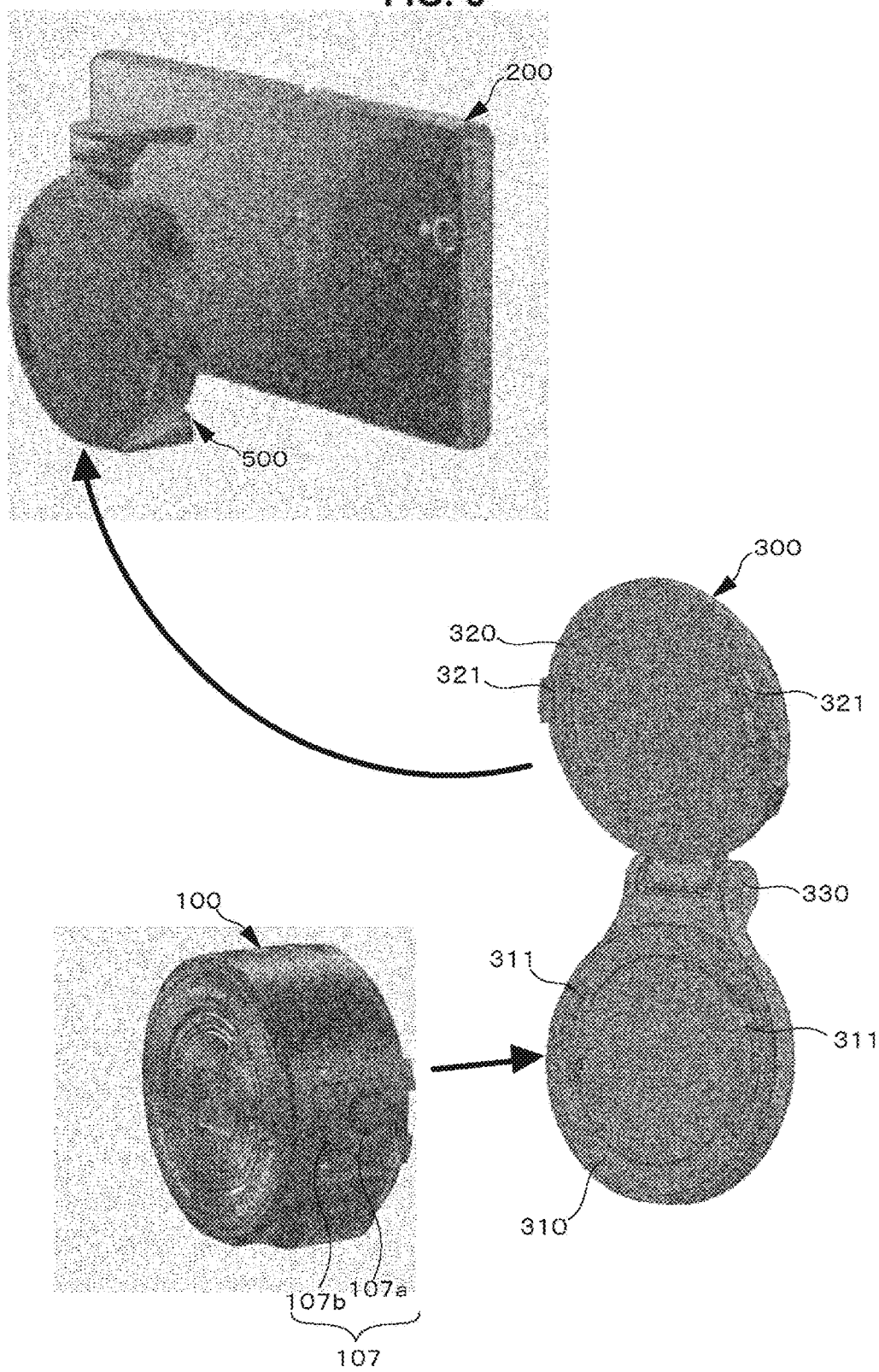
FIG. 6 is a diagram showing a mounting relation among an imaging device, an information processing device, and a mounting device.

FIG. 6 is a diagram showing a mounting relation among the imaging device 100, the mounting device 300, the attachment device 500 and the information processing device 200. As shown, the mounting device 300 includes a first mounting portion 310 and a second mounting portion 320. The first mounting portion 310 and the second mounting portion 320 are connected by the hinge mechanism 330.

The first mounting portion 310 is rotatable in L and M directions using a Z axis direction as a rotation center. Further, the hinge mechanism 330 is rotatable in P and Q directions using a Y axis direction as a rotation center. Further, the first mounting portion 310 is rotatable in S and T directions with respect to the second mounting portion 320 according to rotation of the hinge mechanism 330 using an X axis direction as a rotation center. When the mounting device 300 is closed, the Z axis direction and the Y axis direction are the same direction. Such rotational movements will be described below in detail.

When the attachment device 500 fixed to the information processing device 200 by interposing the information processing device 200 between two claw portions is mounted on the second mounting portion 320 and the imaging device 100 is mounted on the first mounting portion 310, the imaging device 100 is mounted on the information processing device 200.

In the first mounting portion 310, a hooking groove portion 311 for mounting the imaging device 100 is provided. When the hooking groove portion 311 includes a protrusion therein and a hooking claw of the imaging device 100 is hooked on the protrusion of the hooking groove portion 311, the imaging device 100 is mounted on the first mounting portion 310.

In addition, in the second mounting portion 320, a hooking claw portion 321 for mounting the mounting device 300 on the attachment device 500 is provided. When the hooking claw portion 321 is hooked on a protrusion inside a hooking groove of the attachment device 500, the mounting device 300 is mounted on the attachment device 500.

The hooking groove portion 311 provided in the first mounting portion 310 and the hooking groove of the attachment device 500 may have the same shape, and the hooking claw of the imaging device 100 and a hooking claw provided in the second mounting portion 320 may have the same shape. Then, when a hooking groove and a hooking claw of the same shape are also provided in another device, mounting compatibility between devices is maintained and it is possible to mount various devices.

FIG. 7A is a diagram showing a state in which the imaging device 100 is mounted on the information processing device 200 using the mounting device 300 and the attachment device 500, and the hinge mechanism 330 is closed. In addition, FIG. 7B is a diagram showing a state in which the imaging device 100 is mounted on the information processing device 200 using the mounting device 300 and the attachment device 500, and the hinge mechanism 330 is open. In this state, the lens of the imaging device 100 and the display unit 205 of the information processing device 200 face in the same direction.

In the present embodiment, an example in which the information processing device 200 is mounted on the second mounting portion 320 through the attachment device 500 is described. In addition, in the present embodiment, an example in which a smartphone is used as the information processing device 200 is described. However, the information processing device 200 may be a device other than the smartphone, for example, a mobile phone, a portable music player, a tablet terminal, or a personal computer.

The mounting device 300 includes the hinge mechanism 330. When the hinge mechanism 330 rotatably connects the first mounting portion 310 and the second mounting portion 320, as shown in FIG. 7B, the first mounting portion 310 is rotatable in the S and T directions with respect to the second mounting portion 320 using the X axis direction as a rotation center.

In addition, when the first mounting portion 310 performs rotation using the Z axis direction as a rotation center as described above, the imaging device 100 is rotatable in the L and M directions. Further, when the hinge mechanism 330 performs rotation using the Y axis direction as a rotation center, the first mounting portion 310 is rotatable in the P and Q directions. According to the rotation in the P and Q directions, a position of the imaging device 100 with respect to the information processing device 200 is changed.

Figure 8:
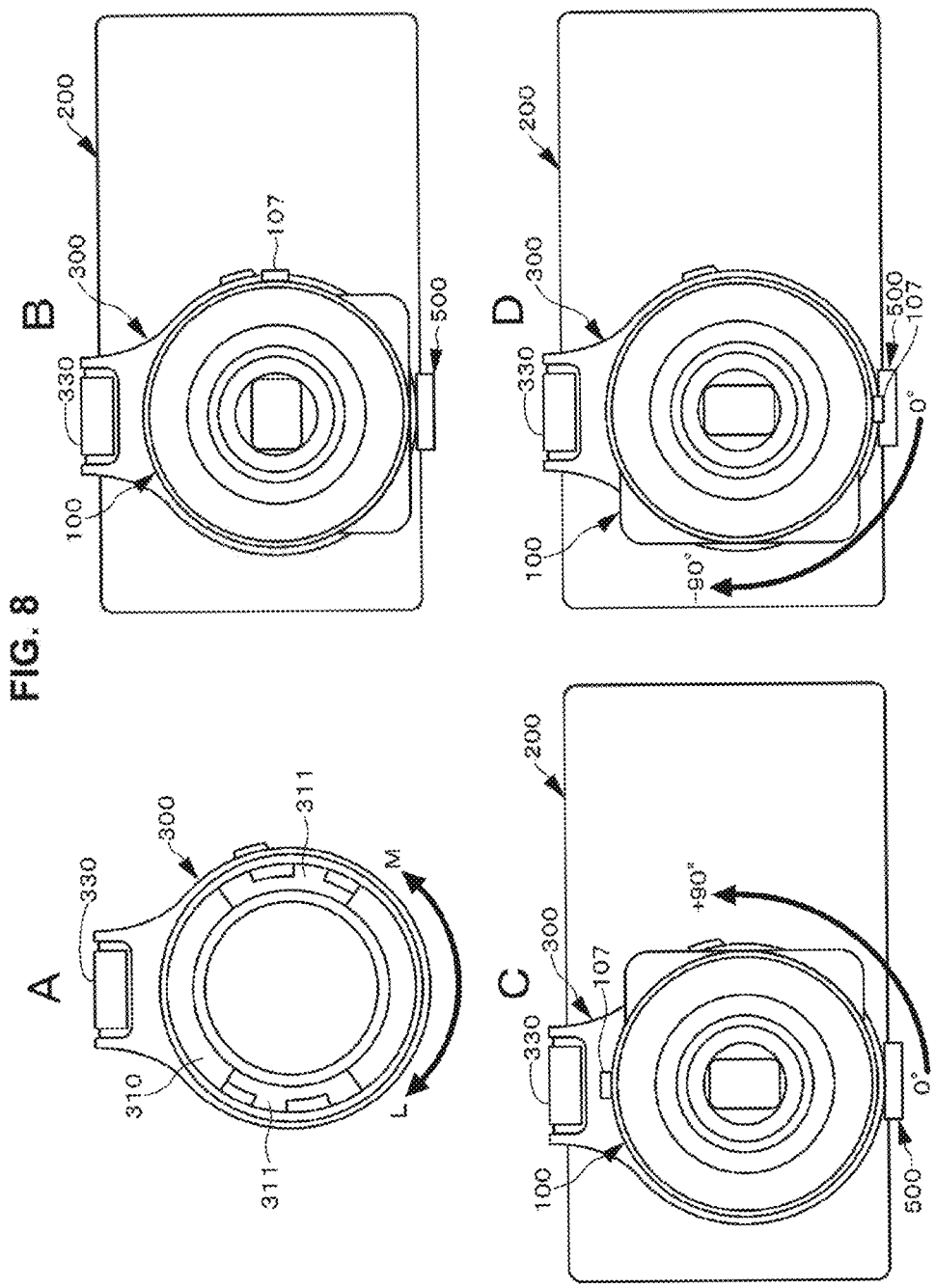
FIG. 8A is a diagram showing a rotation direction of a first rotation mechanism.
FIG. 8B is a diagram showing a rotational movement of a first rotation mechanism.
FIG. 8C is a diagram showing a rotational movement of a first rotation mechanism.
FIG. 8D is a diagram showing a rotational movement of a first rotation mechanism.

In the present embodiment, the first mounting portion 310 is rotatable in the range of 0 degrees to 180 degrees and is fixed at three positions of 0 degrees, +90 degrees, and −90 degrees using 0 degrees as a reference. The rotation of the first mounting portion 310 is referred to as a first rotation mechanism. Here, the rotation of the first rotation mechanism will be described with reference to FIG. 8.

As shown in FIG. 8A, the first mounting portion 310 is rotatable in the range of 0 degrees to 180 degrees in the L and M directions. FIG. 8B, FIG. 8C, and FIG. 8D show states when the imaging device 100 is mounted on the first mounting portion 310 and the information processing device 200 is mounted on the second mounting portion 320 through the attachment device 500.

As shown FIG. 8B, when a state in which the manipulation unit 107 is positioned on the right side of the imaging device 100 is set as a state of 0 degrees, if the first mounting portion 310 is rotated in the M direction (rotation of +90 degrees), the state of the imaging device 100 becomes the state shown in FIG. 8C. In this state, an input unit 107 is positioned on the upper side of the imaging device 100.

On the other hand, as shown in FIG. 8B, when the first mounting portion 310 rotates in the L direction (rotation of −90 degrees) from the state of 0 degrees in which the manipulation unit 107 is positioned on the right side of the imaging device 100, the state of the imaging device 100 becomes the state shown in FIG. 8D. In this state, the input unit 107 is positioned on the lower side of the imaging device 100.

In this manner, when rotation is performed in the L and M directions using a Z axis of the first mounting portion 310, which serves as the first rotation mechanism, as an axis of rotation, it is possible to change a state of the imaging device 100. In the present embodiment, when the input unit 107 is positioned on a side surface side, the imaging element is in a lateral orientation state and the imaging device 100 can capture a lateral orientation image. On the other hand, when the input unit 107 is positioned at the top or bottom, the imaging element is in a vertical orientation state, and the imaging device 100 can capture a vertical orientation image.

Figure 9:
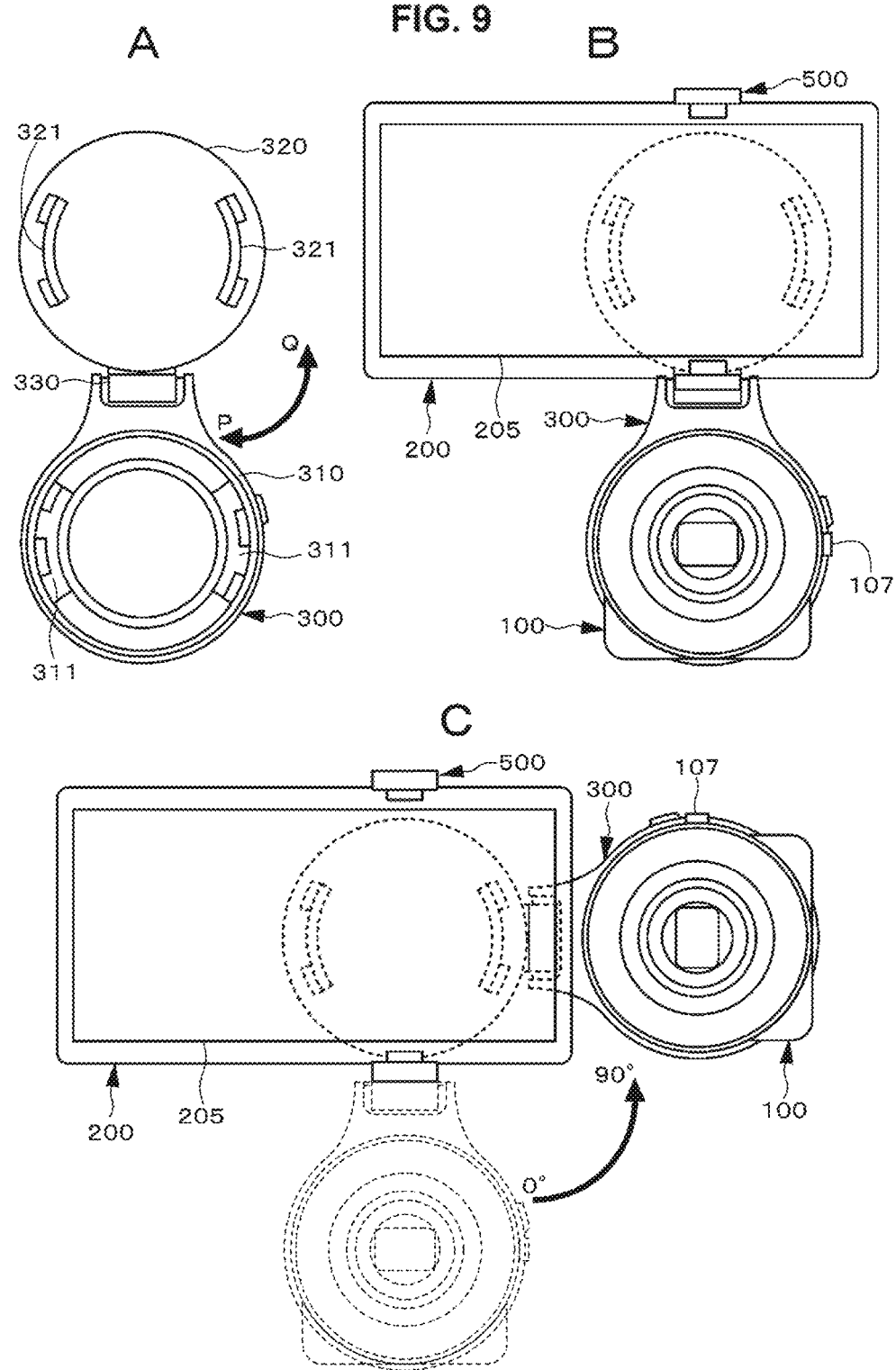
FIG. 9A is a diagram showing a rotation direction of a second rotation mechanism.
FIG. 9B is a diagram showing a rotational movement of a second rotation mechanism.
FIG. 9C is a diagram showing a rotational movement of a second rotation mechanism.

The hinge mechanism 330 is rotatable in the range of 0 degrees to 90 degrees in the P and Q directions using the Y axis direction that is a direction in which a second fixing portion 332 and the second mounting portion 320 are fixed as a rotation center. Accordingly, the first mounting portion 310 is rotatable in the P and Q directions with respect to the second mounting portion 320. Rotation in the P and Q directions using the Y axis direction of the hinge mechanism 330 as a rotation center is referred to as a second rotation mechanism. Here, the rotation of the second rotation mechanism will be described with reference to FIG. 9.

As shown in FIG. 9A, the first mounting portion 310 is rotatable 90 degrees in the P and Q directions with respect to the second mounting portion 320. FIG. 9B and FIG. 9C show states in which the imaging device 100 is mounted on the first mounting portion 310 and the information processing device 200 is mounted on the second mounting portion 320 through the attachment device 500. In FIG. 9B and FIG. 9C, the second mounting portion 320 is indicated by dashed lines because it is hidden by the information processing device 200.

When a state in which the imaging device 100 is positioned below the long side of the information processing device 200 in a lateral orientation state as shown in FIG. 9B is set as a state of 0 degrees, if the second rotation mechanism is rotated 90 degrees in the Q direction, the state of the imaging device 100 becomes the state shown in FIG. 9C. In this state, the imaging device 100 is positioned next to the short side of the information processing device 200 in a lateral orientation state.

On the other hand, when the second rotation mechanism is rotated 90 degrees in the P direction from the state shown M FIG. 9C, the imaging device 100 returns to the state shown in FIG. 9B. In this state, the imaging device 100 is positioned below the long side of the information processing device 200 in a lateral orientation state.

In addition, as shown in FIG. 10A, even when the imaging device 100 is positioned above the long side of the information processing device 200 in a lateral orientation state, if the second rotation mechanism is rotated 90 degrees in the Q direction, the imaging device 100 can be positioned next to the short side of the information processing device 200 in a lateral orientation state as shown in FIG. 10B.

Even when the information processing device 200 is in a vertical orientation state, if the second rotation mechanism is rotated in the same manner, the position of the imaging device 100 can be changed to next to or above, or next to or below the information processing device 200.

In this manner, according to the rotation of the second rotation mechanism, when the hinge mechanism is open, it is possible to switch the imaging device 100 to be positioned on the short side or the long side of the information processing device 200.

Figure 11:
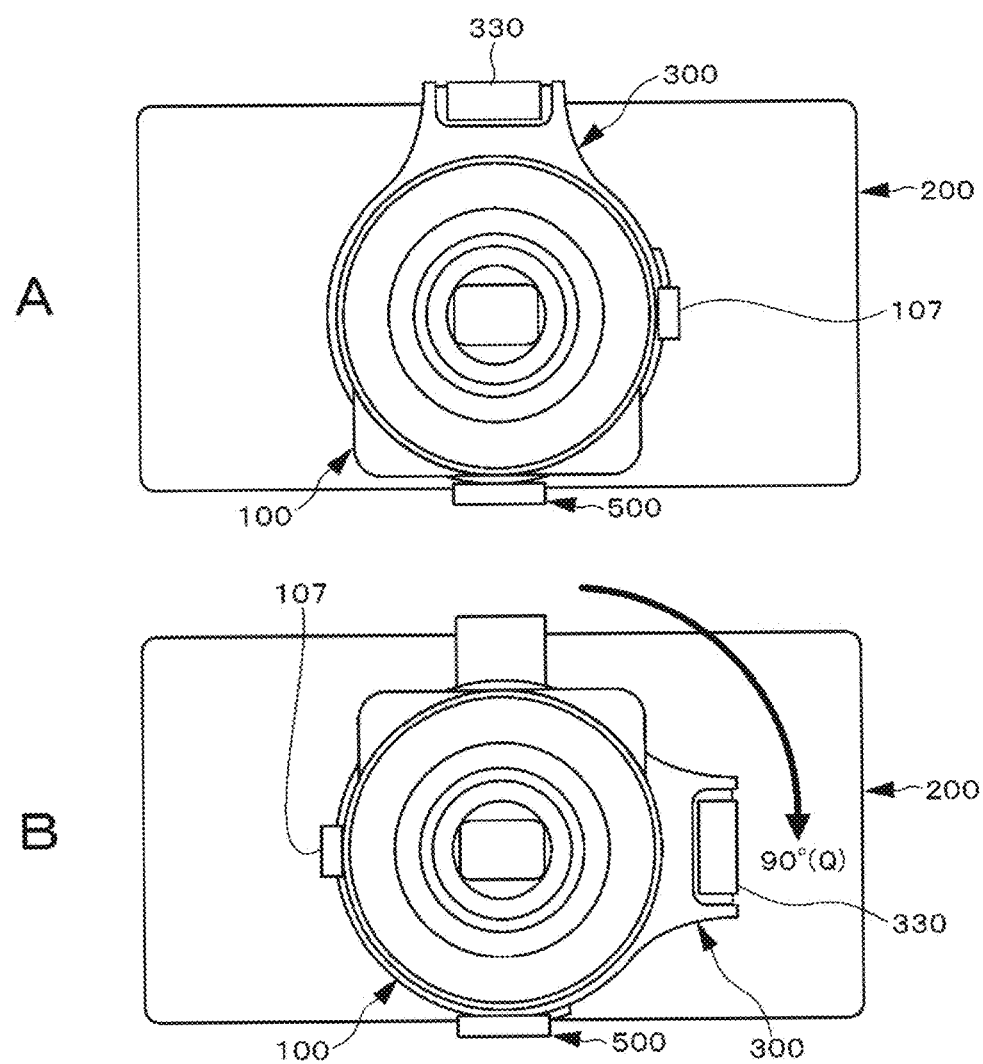
FIG. 11A is a diagram showing a rotational movement of a second rotation mechanism when a hinge is closed.
FIG. 11B is a diagram showing a rotational movement of a second rotation mechanism when a hinge is closed.

In addition, as shown in FIG. 11, when the hinge mechanism 330 is closed, if the second rotation mechanism is rotated, it is possible to change an orientation of the imaging device 100.

Figure 12:
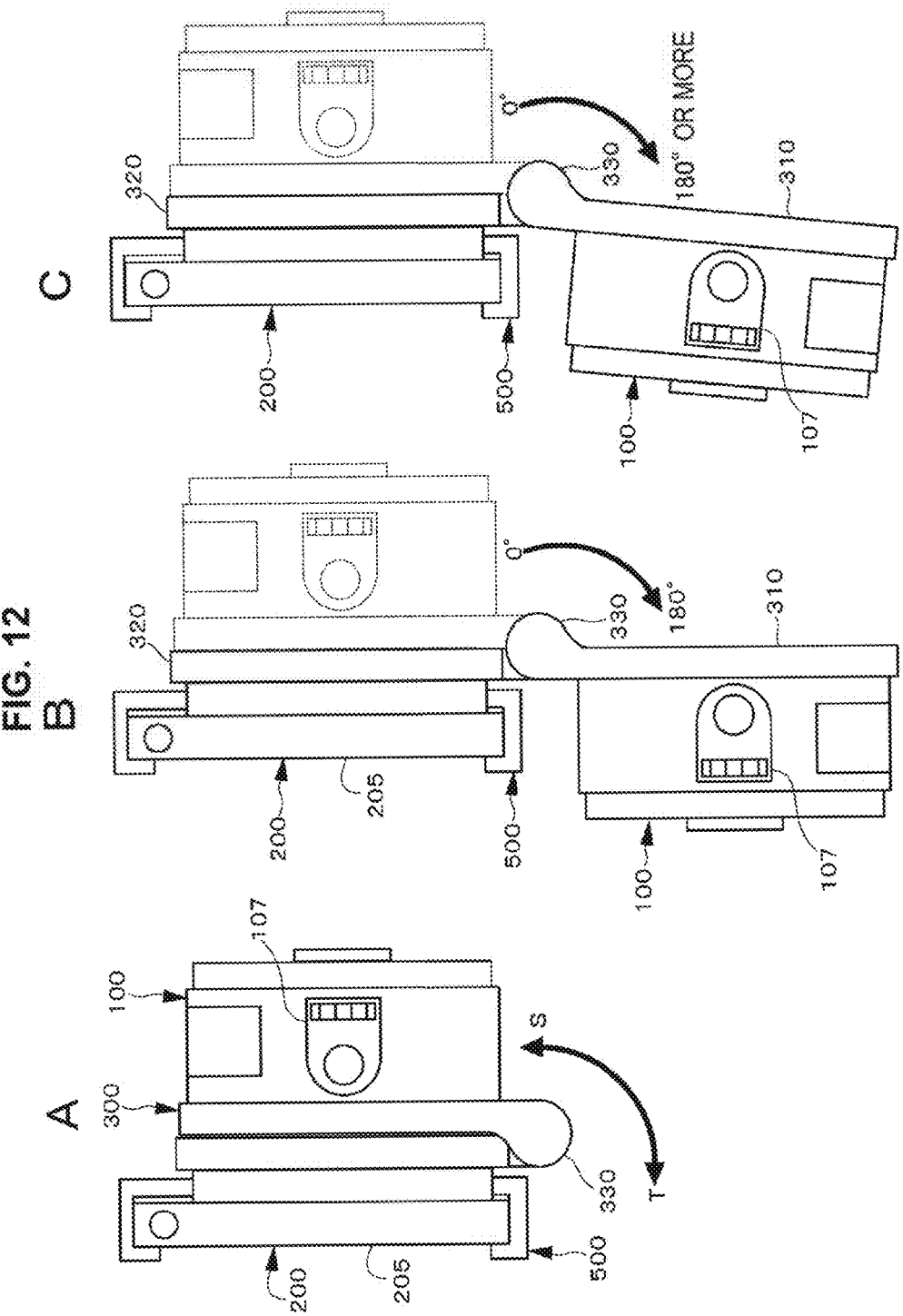
FIG. 12A is a diagram showing a rotation direction of a third rotation mechanism.
FIG. 12B is a diagram showing a rotational movement of a third rotation mechanism.
FIG. 12C is a diagram showing a rotational movement of a third rotation mechanism.

The hinge mechanism 330 includes a first fixing portion 331 fixing the first mounting portion 310, a hinge portion 333, and the second fixing portion 332 fixing the second mounting portion 320. When the first fixing portion 331 and the second fixing portion 332 are connected at the hinge portion 333, the first fixing portion 331 is rotatable with respect to the second fixing portion 332. Rotation of the hinge mechanism 330 in the S and T directions is referred to as a third rotation mechanism. Here, the rotation of the third rotation mechanism will be described with reference to FIG. 12.

FIG. 12A shows a state in which the imaging device 100 and the information processing device 200 are mounted in the mounting device 300, and the hinge mechanism 330 is not open. In this state, the lens of the imaging device 100 and the display unit 205 of the information processing device 200 face in opposite directions.

When the hinge mechanism 300 is operated from the state of FIG. 12A and thus the first mounting portion 310 is rotated in the T direction, it is possible to change an orientation of the imaging device 100. Then, when the third rotation mechanism is rotated 180 degrees to a state in which the first mounting portion 310 and the second mounting portion 320 are arranged in a straight line, the lens of the imaging device 100 and the display unit 205 of the information processing device 200 face in the same direction as shown in FIG. 12B.

Here, for example, a case in which the hinge portion 333 is rotated, the lens of the imaging device 100 and the display unit 205 of the information processing device 200 face in substantially the same direction, and the user performs a selfie while viewing a through image displayed on the display unit 205 is considered. In this case, since there is a distance between the display unit 205 and the lens of the imaging device 100, deviation may occur in an orientation of the lens of the imaging device 100 and a position of the user's face, and the user's gaze may not match the lens, which may result in failure to obtain so-called camera gaze.

Therefore, when a state in which the hinge portion 333 is closed is set to 0 degrees and a state in which the hinge is open and the first mounting portion 310 and the second mounting portion 328 are arranged in a straight line is set to 180 degrees, the hinge portion 333 is opened by rotation in a predetermined range of 180 degrees or more. When the hinge mechanism 330 is openable 180 degrees or more, since the lens of the imaging device 100 can face the user, it is possible to easily capture a camera gaze image in which the user's gaze matches the lens. FIG. 12C is a diagram showing a state in which the hinge portion 333 is open 180 degrees or more.

When the hinge mechanism 330 is rotated in the S direction from the state shown in FIG. 12B or FIG. 12C, the state can be returned to the state of FIG. 12A.

FIG. 13A is an exploded perspective view of a configuration of the mounting device 300. FIG. 13B is a perspective view when the hinge mechanism 330 is open. The mounting device 300 includes the first mounting portion 310, the second mounting portion 320, the hinge mechanism 330, a frame portion 340, a first click mechanism 350, a first inner surface portion 360, a second inner surface portion 380, a second click mechanism 370, a cover portion 390, and a locking mechanism 400.

The hinge mechanism 330 includes the first annular fixing portion 331 fixing the first mounting portion 310, the hinge portion 333, and the second annular fixing portion 332 fixing the second mounting portion 320. When the first fixing portion 331 and the second fixing portion 332 are connected at the hinge portion 333, the first fixing portion 331 is rotatable in the S and T directions with respect to the second fixing portion 332 using the X axis direction as a rotation center. According to the rotation, the first mounting portion 310 is rotatable in the S and T directions with respect to the second mounting portion 320. A hinge cover 336 is provided in the hinge portion 333.

The first mounting portion 310 and the first inner surface portion 360 surround the first fixing portion 331 of the hinge mechanism 330 in the frame portion 340 and are fixed by, for example, a screw. The first mounting portion 310 slides with respect to the first fixing portion 331 of the hinge mechanism 330 and is rotatable in the L and M directions using a direction (the Z axis direction) in which the imaging device 100 is mounted on the first mounting portion 310 as a rotation center.

Figure 14:
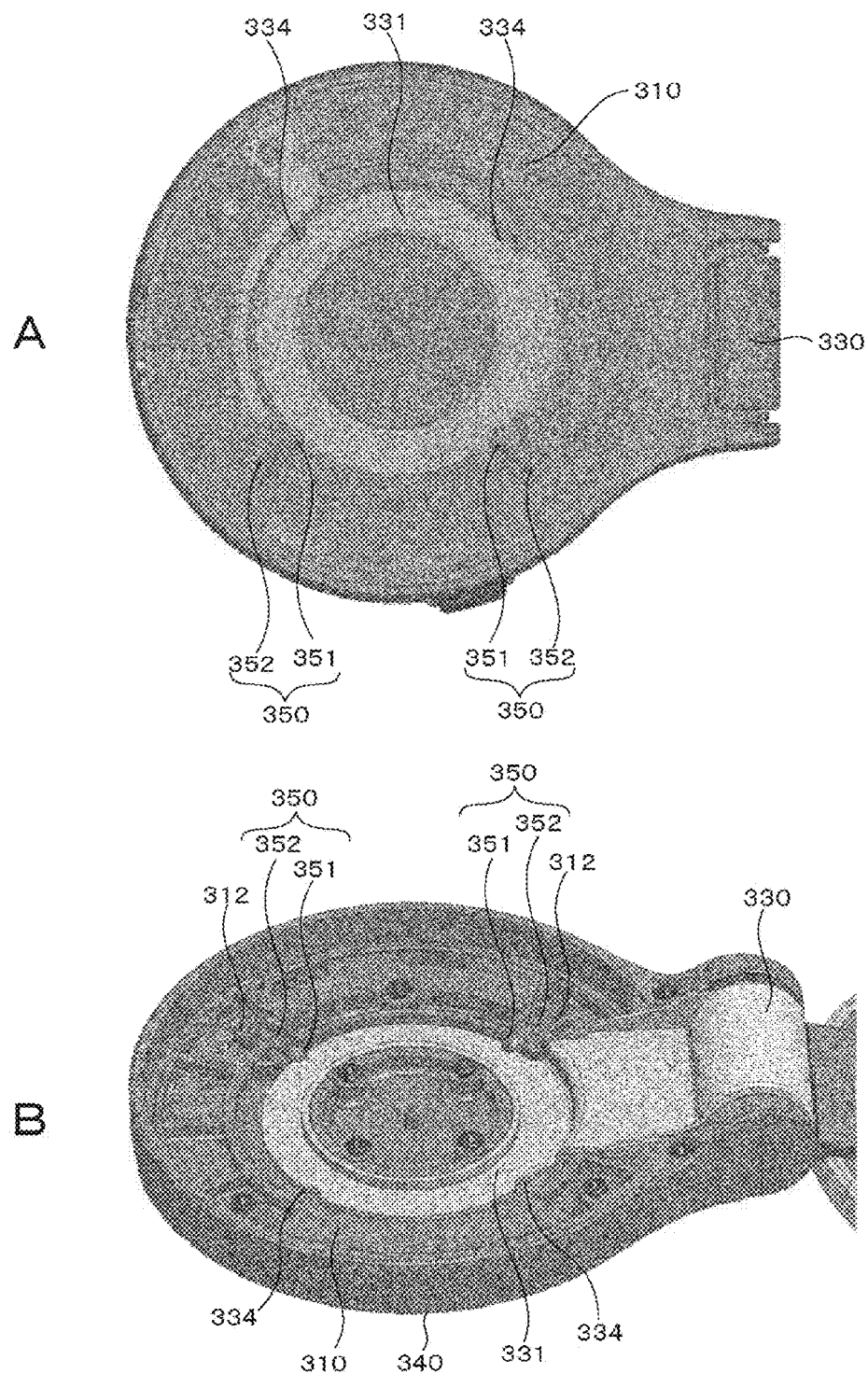
FIG. 14A is a partially transparent plan view of an internal structure of a first mounting portion.
FIG. 14B is a perspective view of an internal structure of a first mounting portion.

The first click mechanism 350 is provided inside the first mounting portion 310. FIG. 14 is a diagram showing a configuration of the first click mechanism 350. FIG. 14A is a transparent view of an inside of the first mounting portion 310. FIG. 14B is a diagram showing an inside of the first mounting portion 310 excluding the first inner surface portion 360.

The first click mechanism 350 includes a ball 351 and an elastic body 352 such as a spring for energizing the ball 351 in a direction of the first fixing portion 331. The first click mechanism 350 is provided in an internal groove 312 that is provided on an inner surface of the first mounting portion 310. While the two first click mechanisms 350 are provided in the present embodiment, the number thereof is not limited to 2.

On an outer circumferential surface of the first fixing portion 331 of the hinge portion 333, a plurality of first engaging portions 334 having notch shapes on which the ball 351 of the first click mechanism 350 is caught are provided. The first mounting portion 310 is rotatable with respect to the first fixing portion 331 and the ball 351 of the first click mechanism 350 is caught on the first engaging portion 334. Therefore, a click sensation is provided and rotation of the first mounting portion 310 is locked.

In the present embodiment, the first mounting portion 310 is rotatable in the range of 0 to 180 degrees and is fixed at three positions of 0 degrees, +90 degrees, and −90 degrees using 0 degrees as a reference. However, the number of fixing positions of the first mounting portion 310 is not limited to 3.

The hinge mechanism 330 is rotatable in the range of 0 degrees to 90 degrees in the P and Q directions using the Y axis direction that is a direction in which the second fixing portion 332 and the second mounting portion 320 are fixed as a rotation center. The rotation of the hinge mechanism 330 is different from rotation in the S and T directions according to rotation of the hinge portion 333.

Figure 15:
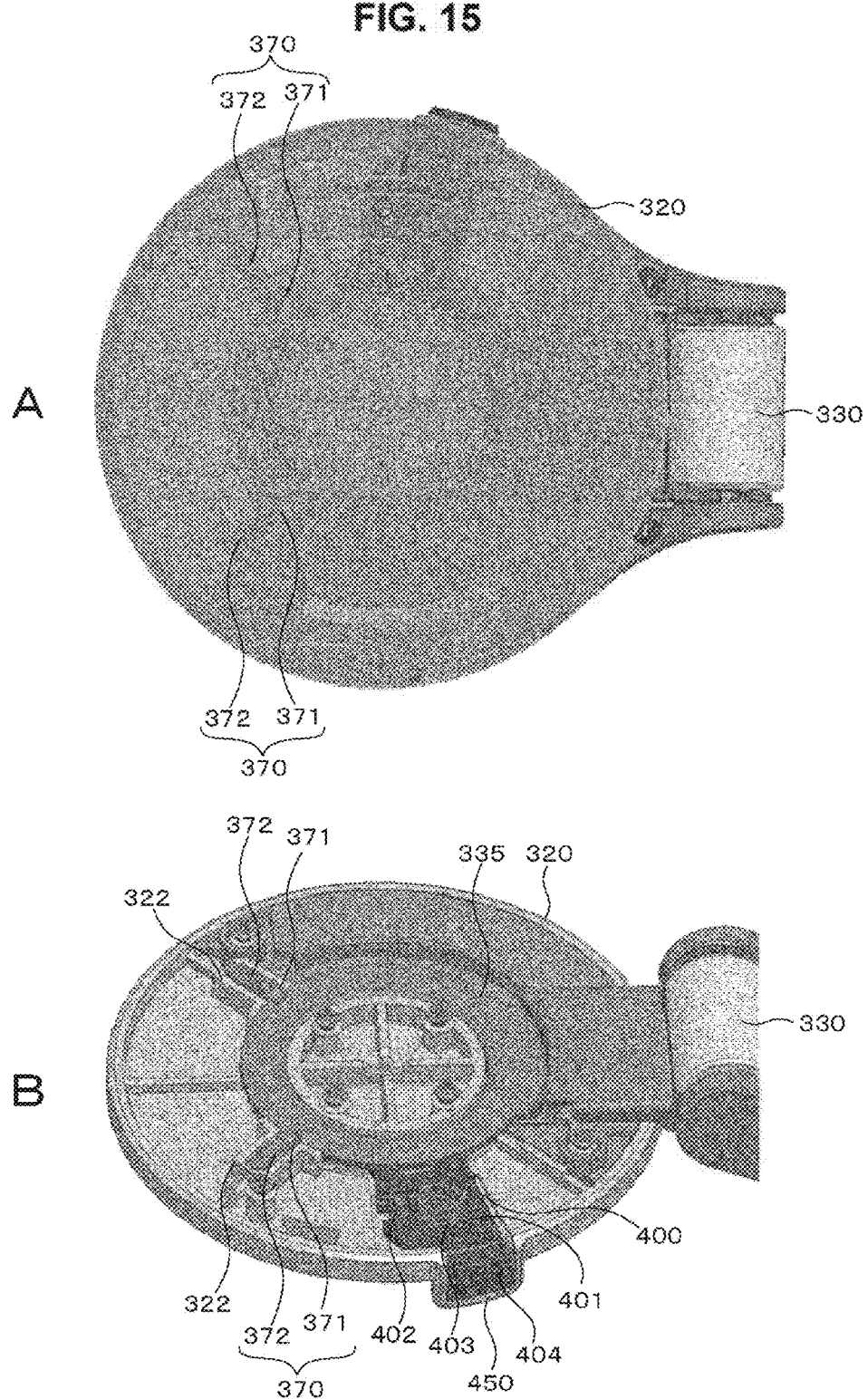
FIG. 15A is a partially transparent plan view of an internal structure of a second mounting portion 320.
FIG. 15B is a perspective view of an internal structure of the second mounting portion 320.

The second click mechanism 370 is provided on an inner surface of the second mounting portion 320. FIG. 15A is a transparent view of an inside of the second mounting portion 320. FIG. 15B is a diagram showing an inside of the second mounting portion 320 excluding the second inner surface portion 380.

The second click mechanism 370 includes a ball 371 and an elastic body 372 such as a spring for energizing the ball 371 in a direction of the second fixing portion 332. The second click mechanism 370 is provided in an internal groove 322 that is provided on the inner surface of the second mounting portion 320. While the two first click mechanisms 350 are provided in the present embodiment, the number thereof is not limited to 2.

On an outer circumferential surface of the second fixing portion 332 of the hinge portion 333, a plurality of second engaging portions 335 having notch shapes on which the ball 371 of the second click mechanism 370 is caught are provided. The second mounting portion 320 is rotatable with respect to the second fixing portion 332, and the ball 371 of the second click mechanism 370 is caught on a second engaging portion 335. Therefore, a click sensation is provided and rotation of the second mounting portion 320 is locked. The second rotation mechanism of the hinge mechanism 330 is locked at two positions of 0 degrees and 90 degrees. The click mechanism is formed as described above.

Figure 13:
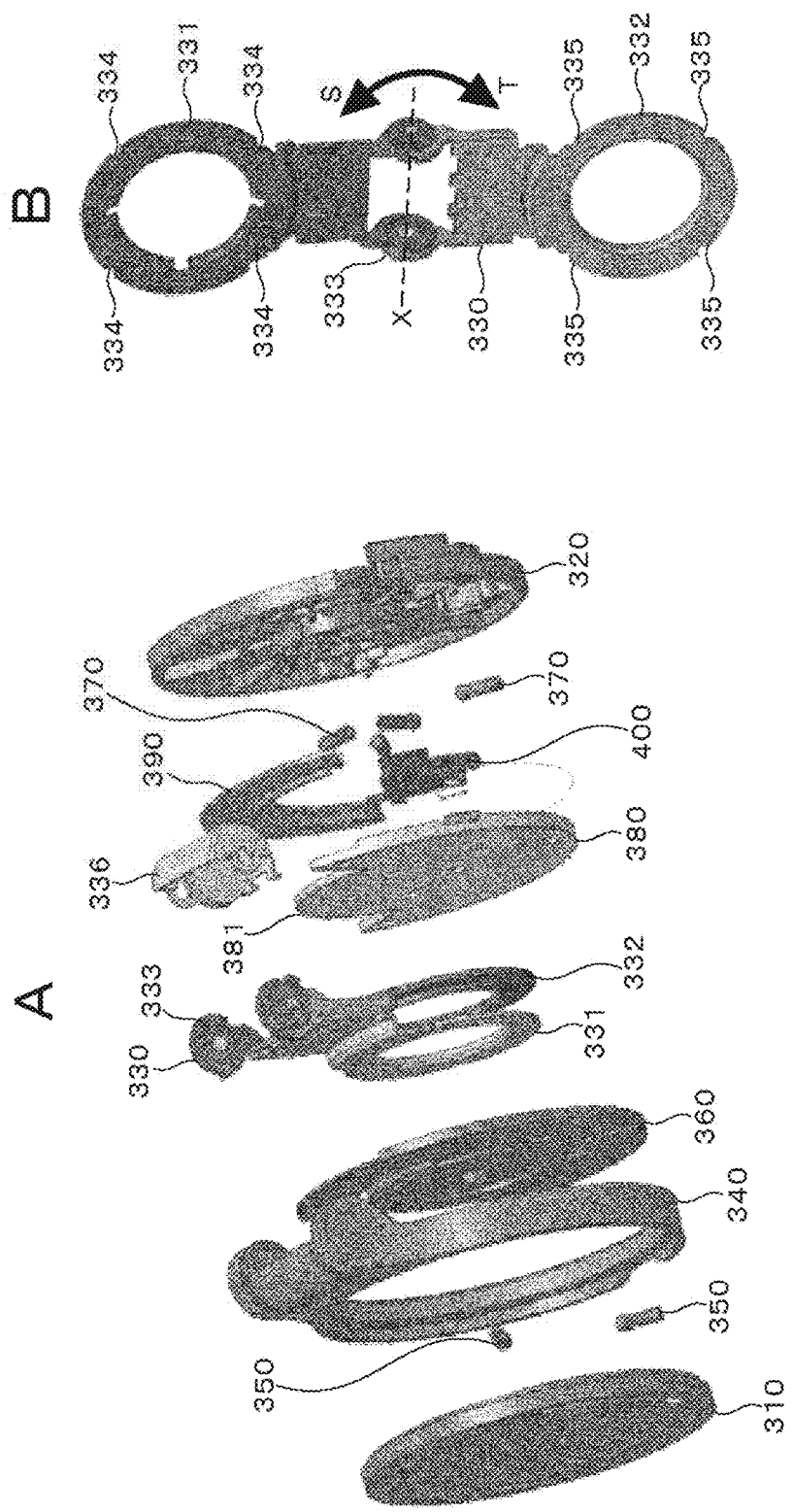
FIG. 13 is an exploded perspective view of a mounting device.

Referring to FIG. 13, the description will return to the configuration of the mounting device 300. In the second inner surface portion 380, a notch portion 381 for rotation of the second rotation mechanism, which is rotation of the hinge mechanism 330 in the P and Q directions, is provided. The notch portion 381 is provided to prevent the second inner surface portion 380 from interfering with rotation of the hinge mechanism 330. The cover portion 390 for covering the second mounting portion 320 that is exposed due to the notch portion 381 is fixed to the second mounting portion 320.

Figure 16:
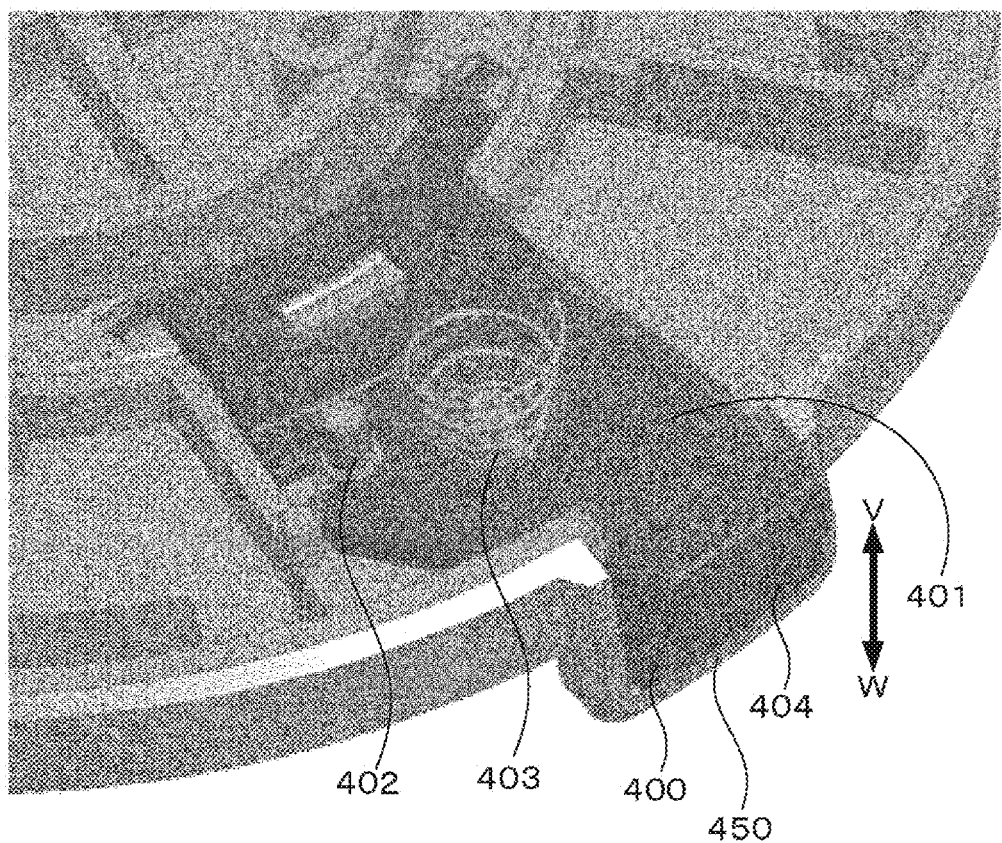
FIG. 16 is a partially enlarged view of a configuration of a locking mechanism.

In addition, the locking mechanism 400 is provided in the second mounting portion 320. FIG. 16 is a diagram showing a configuration of the locking mechanism 400. The locking mechanism 400 includes a movable portion 401, a pin 402 and an elastic body 403. One end of the movable portion 401 is exposed from a side surface of the second mounting portion 320 and is formed as a manipulation piece 404 for the user to perform manipulation. The movable portion 401 has the other end that is axially supported by the second mounting portion 320 and is rotatable in V and W directions using the axis as a center.

The pin 402 is provided to protrude from the inner surface of the second mounting portion 320 in a substantially vertical direction and protrudes from a mounting surface that is a rear surface of the second mounting portion 320. When a flange portion of the pin 402 is caught on the movable portion 401, an operation is performed in a direction that is the same as an operation direction of the movable portion 401 in conjunction with the operation of the movable portion 401. The movable portion 401 is always energized in a direction in which the pin 402 protrudes from the mounting surface of the second mounting portion 320 (the W direction) by the elastic body 403.

Operations of the locking mechanism 400 will be described. First, the second mounting portion 320 is fitted on a mounting surface such that the hooking claw portion 321 of the second mounting portion 320 is fixed to a hooking groove of the mounting surface of the attachment device 500 in order to mount the attachment device 500 on the second mounting portion 320. Then, the pin protruding from the second mounting portion 320 is pushed by the mounting surface of the attachment device 500 and is retracted in an internal direction (the V direction) of the second mounting portion 320.

Then, when the second mounting portion 320 slides with respect to the mounting surface of the attachment device 500, the pin 402 enters a hole that is provided on the mounting surface of the attachment device 500. In addition, the hooking claw portion 321 of the second mounting portion 320 is caught on a claw in the hooking, groove of the mounting surface of the attachment device 500. According to the catching on the claw, movement in a mounting direction of the mounting surfaces of the second mounting portion 320 and the attachment device 500 is restricted. In addition, when the pin 402 enters a hole of the mounting surface, sliding with respect to the mounting surface of the attachment device 500 of the second mounting portion 320 is restricted. Accordingly, a mounting state of the second mounting portion 320 and the attachment device 500 is locked.

In order to release the mounting state, the manipulation piece 404 is manipulated and the movable portion 401 is operated in the V direction. Then, since the pin 402 also moves in the V direction, the pin 402 comes out of the hole of the mounting surface of the attachment device 500. When the pin 402 comes out of the hole, the second mounting portion 320 is slidable with respect to the mounting surface of the attachment device 500. Therefore, the mounting state is released when the second mounting portion 0 slides in a direction opposite to the mounting direction.

As shown in FIG. 15B and FIG. 16, on a side surface of the second mounting portion 320, a protrusion portion 450 protruding in the mounting direction with the attachment device 500 is provided. The protrusion portion 450 is provided to prevent the mounting device 300 from being mounted on a specific external device. The protrusion portion 450 corresponds to a mounting exclusion mechanism in the appended claims.

In an external device on which the mounting device 300 can be mounted, a recess portion for receiving the protrusion portion 450 in the mounting state is provided. Accordingly, the protrusion portion 450 does not prevent mounting of the mounting device 300 and the external device. On the other hand, in a specific external device on which mounting is not possible, a recess portion for receiving the protrusion portion 450 is not provided. Accordingly, when mounting of the mounting device 300 on the external device is attempted, since the protrusion portion 450 comes in contact with a mounting surface of the external device, the mounting device 300 is unable to be mounted. Accordingly, for example, it is possible to prevent the mounting device 300 from being mounted on a device that has a risk of failure when it is mounted thereon. As shown in FIG. 15B and FIG. 16, the manipulation piece 404 of the locking mechanism 400 is provided to be embedded in the protrusion portion.

As described above, the hinge mechanism 330 includes the first fixing portion 331 fixing the first mounting portion 310, the hinge portion 333, and the second fixing portion 332 fixing the second mounting portion 320. When the first fixing portion 331 and the second fixing portion 332 are connected at the hinge portion 333, the first fixing portion 331 is rotatable with respect to the second fixing portion 332.

The mounting device 300 is formed as described above. Alternatively, the mounting device 300 and the imaging device 100 may be integrally formed as an imaging unit. In addition, the attachment device 500 and the second mounting portion 320 may be integrally formed, and the mounting device may be directly mounted on the information processing device 200. Further, the imaging device 100, the mounting device 300, and the attachment device 500 may be integrally formed.

[1-5. Operation of Mounting Device]

Next, operations of the mounting device 300 will be described. First, as the first rotation mechanism, the first mounting portion 310 of the mounting device 300 is rotatable with respect to the first fixing portion 331 of the hinge mechanism 330. Accordingly, as shown in FIG. 7A, it is possible to rotate the imaging device 100 in the L and M directions using the Z axis direction as a rotation center. When the first mounting portion 310 is rotated, it is possible to change a position of the manipulation unit 107 of the imaging device 100. In other words, regardless of the state to which the imaging device 100 is changed, it is possible to prevent the position of the manipulation unit 107 from being changed.

In addition, as shown in FIG. 7B, as the second rotation mechanism, the hinge mechanism 330 is rotatable in the P and Q directions using the Y axis direction as a rotation center. Accordingly, it is possible to switch whether a position of the hinge portion 333 of the hinge mechanism 330 is positioned on a side surface side of the information processing device 200 or positioned on a top surface or bottom surface side.

Further, as shown in FIG. 7B, in the mounting device 300, according to rotational movement of the hinge portion 333 of the hinge mechanism 330 serving as the third rotation mechanism, the first mounting portion 310 can operate in the S and T directions with respect to the second mounting portion 320. Accordingly, it is possible to change an orientation of the lens of the imaging device 100 mounted on the first mounting portion 310. When the orientation of the lens of the imaging device 100 is changed, it is possible to perform imaging while the display unit of the information processing device 200 and the lens of the imaging device 100 face in the same direction. This operation is effective, for example, in a so-called selfie in which the user performs imaging with the lens of the imaging device 100 facing the user himself or herself.

Next, a state of the imaging device 100 and the information processing device 200 implemented in a combination of the above-described three movements of the mounting device 300 will be described with reference to FIG. 17. First, a state that is implemented by rotating the hinge mechanism 330 and in which the information processing device 200 shown in FIG. 17 is in a horizontal state (hereinafter referred to as a horizontal state) and the imaging device 100 is positioned next to the information processing device 200 is set as a first state.

Figure 17:
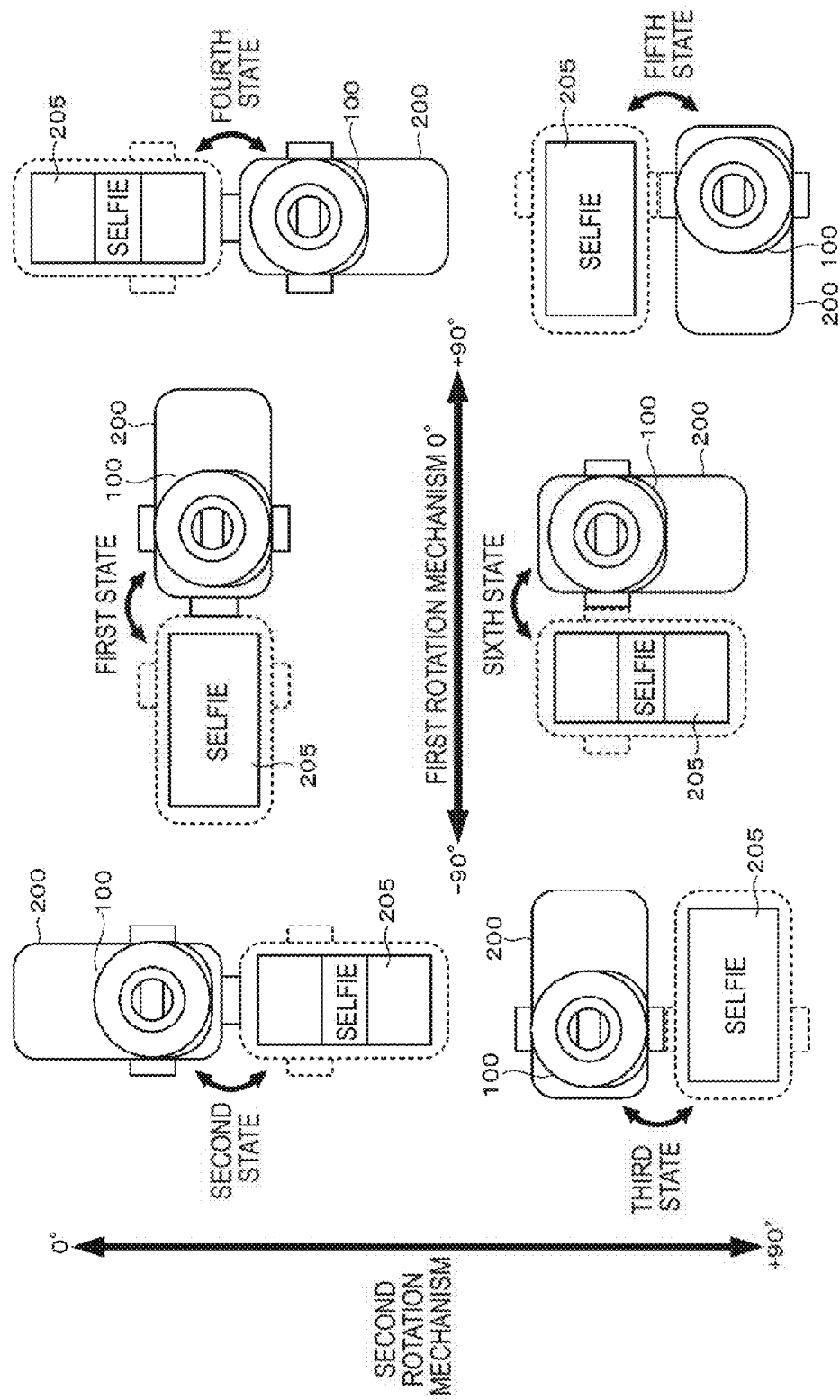
FIG. 17 is a diagram showing states of an imaging device and an information processing device that are implemented by operation of a mounting device.

When only the first rotation mechanism serving as rotation of the first mounting portion 310 is rotated 90 degrees, the state changes from the first state to a second state shown in FIG. 17. In the second state, the information processing device 200 is in a vertical state, and a through image of a lateral orientation is displayed on the display unit 205 of the information processing device 200 in a vertical state.

In the second state, when the first rotation mechanism is rotated 90 degrees in a right direction, a position of the manipulation unit 107 can be positioned on the right side of the imaging device 100, which is the same as in the first state. Therefore, even if the orientation of the imaging device 100 and the information processing device 200 is changed, positions of a release button and a zoom lever are not changed. Accordingly, a manipulation sensation is not changed and it is easy to use the imaging device 100.

When the second rotation mechanism is rotated 90 degrees, the imaging device 100 is positioned on a side surface side of the information processing device 200 and the information processing device 200 is set to a horizontal state, the state changes from the second state to a third state shown in FIG. 17. In this state, since a large through image of a lateral orientation is displayed on the display unit of the information processing device 200 in a horizontal state, the user is in a state appropriate for a selfie in which he or she can check a large through image.

Figure 21:
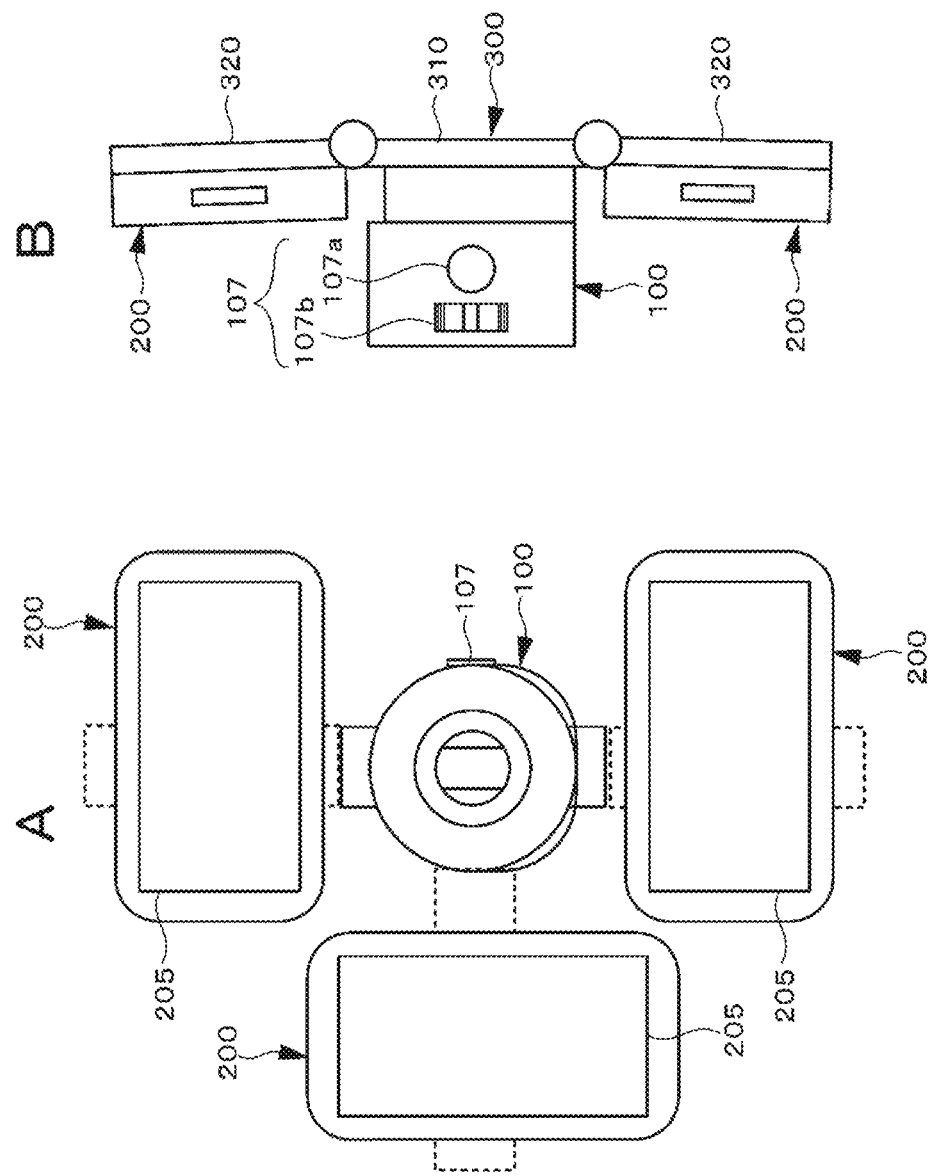
FIG. 21A is a front view showing a positional relation between an imaging device and an information processing device mounted in a mounting device.
FIG. 21B is a side view showing a positional relation between an imaging device and an information processing device mounted in a mounting device.

In addition, when a state in which the hinge portion 333 is not open is set to 0 degrees and the third rotation mechanism is open within the range of 0 degrees to about 90 degrees, the third state in which the imaging device 100 is positioned above the information processing device 200 becomes a state appropriate for so-called high angle imaging. FIG. 21 is a diagram showing a state of high angle imaging. The high angle imaging is an imaging technique in which the user holds the imaging device 100 up, checks a through image using the display unit 205 of the information processing device 200 that faces downward, and then performs imaging. As shown in FIG. 21, when the mounting device 300 is used to set a state in which the third rotation mechanism is open within the range of 0 degrees to about 90 degrees, the display unit 205 of the information processing device 200 can face the user side, and high angle imaging can be easily performed.

When only the first rotation mechanism serving as rotation of the first mounting portion 310 is rotated 90 degrees in a direction opposite to a direction in which the state transitions to the second state, the state changes from the first state to a fourth state shown in FIG. 17. In this state, since the information processing device 200 is in a vertical state, a through image of a lateral orientation is displayed on the display unit of the information processing device 200 in a vertical state.

In the fourth state, when the first rotation mechanism is rotated 90 degrees in a left direction, positions of a release button and a zoom lever can be positioned on the right side of the imaging device 100, which are the same as in the first state. Therefore, even if the orientation of the imaging device 100 and the information processing device 200 is changed, the positions of the release button and the zoom lever are not changed. Accordingly, a manipulation sensation is not changed and convenience is increased.

When the second rotation mechanism is rotated 90 degrees, the imaging device 100 is positioned on a side surface side of the information processing device 200, and the information processing device 200 is set to a horizontal state, the state changes from the fourth state to a fifth state shown in FIG. 17. In the fifth state, since a large through image of a lateral orientation is displayed on the display unit 205 of the information processing device 200 in a horizontal state, the user is in a state appropriate for a selfie in which be or she can check the large through image.

Figure 28:
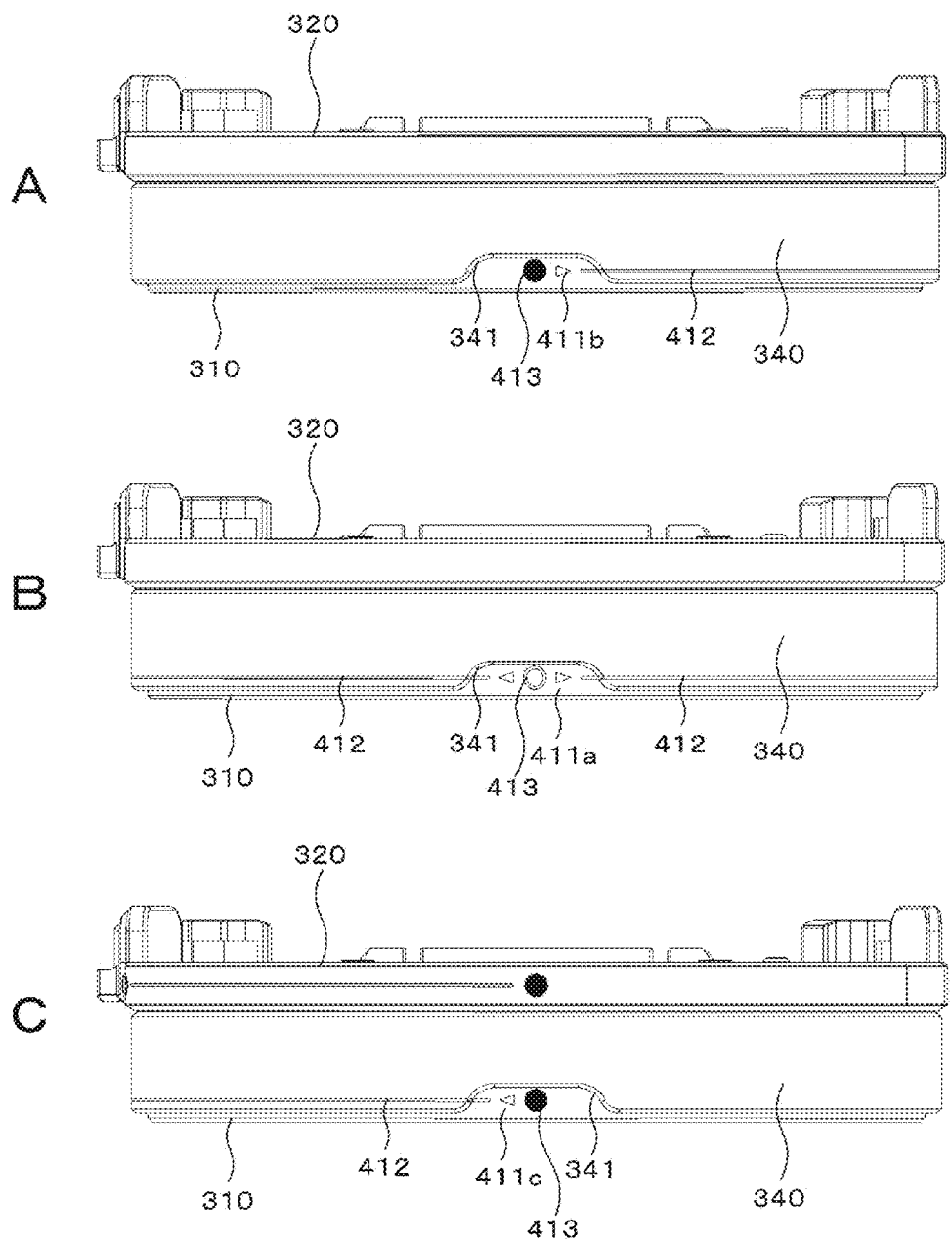
FIG. 28A, FIG. 28B and FIG. 28C are side views of a mounting device showing manipulation indicators provided on the mounting device.

In addition, when a state in which the hinge portion 333 is not open is set to 0 degrees and the third rotation mechanism is open within the range of 0 degrees to about 90 degrees, the fifth state in which the imaging device 100 is positioned below the information processing device 200 becomes a state appropriate for so-called low angle imaging. FIG. 28 is a diagram showing a state of low angle imaging. The low angle imaging is an imaging technique in which the user holds the imaging device 100 down, checks a through image using the display unit 205 of the information processing device 200 that faces upward, and then performs imaging. As shown in FIG. 28, when the mounting device 300 is used to set a state in which the third rotation mechanism is open within the range of 0 degrees to about 90 degrees, the display unit 205 of the information processing device 200 can face the user side, and low angle imaging can be easily performed.

Further, when the information processing device 200 is set to a vertical state and the imaging device 100 is positioned next to the information processing device 200, the state changes from the fifth state to a sixth state shown in FIG. 17. In this state, since the information processing device 200 is in a vertical state, a through image of a lateral orientation is displayed on the display unit 205 of the information processing device 200 in a vertical state.

Figure 29:
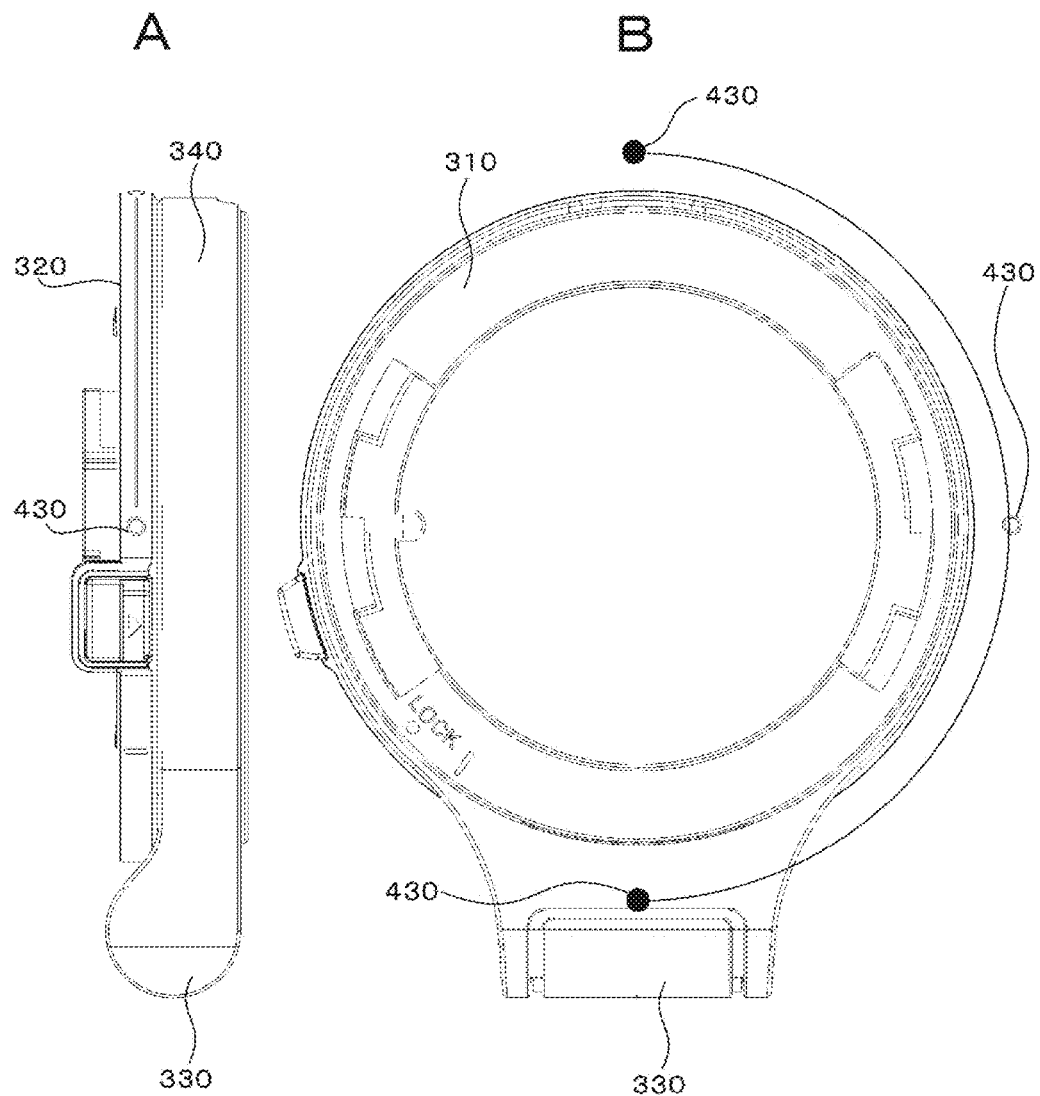
FIG. 29A is a side view of a mounting device showing a manipulation indicator provided on a mounting device.
FIG. 29B is a plan view of a mounting device showing a manipulation indicator provided on the mounting device.

FIG. 21 shows a use example when a so-called selfie is performed in the first state to the sixth state. As shown in FIG. 29, the lens of the imaging device 100 and the display unit 205 of the information processing device 200 face in the same direction, and the user grasps the imaging device 100 or the information processing device 200 by hand, and can easily perform a selfie with the lens of the imaging device 100 facing the user side.

In the first to sixth states shown in FIG. 17, in addition to performing a selfie when the lens of the imaging device 100 and the display unit 205 of the information processing device 208 face in the same direction, it is also possible to perform general imaging with the lens of the imaging device 100 and the display unit 205 of the information processing device 200 that face in opposite directions.

The mounting device 300 can rotate the imaging device 100 itself according to rotation of the first rotation mechanism. Accordingly, as shown in FIG. 21, regardless of the position in which the information processing device 200 is positioned, for example, whether it is above, below or next to the imaging device 100, the imaging device 100 is rotated according to rotation of the first rotation mechanism and thus it is always possible to release a manipulation unit side. Accordingly, the information processing device 200 does not interfere with manipulation of the imaging device 100.

Figure 22:
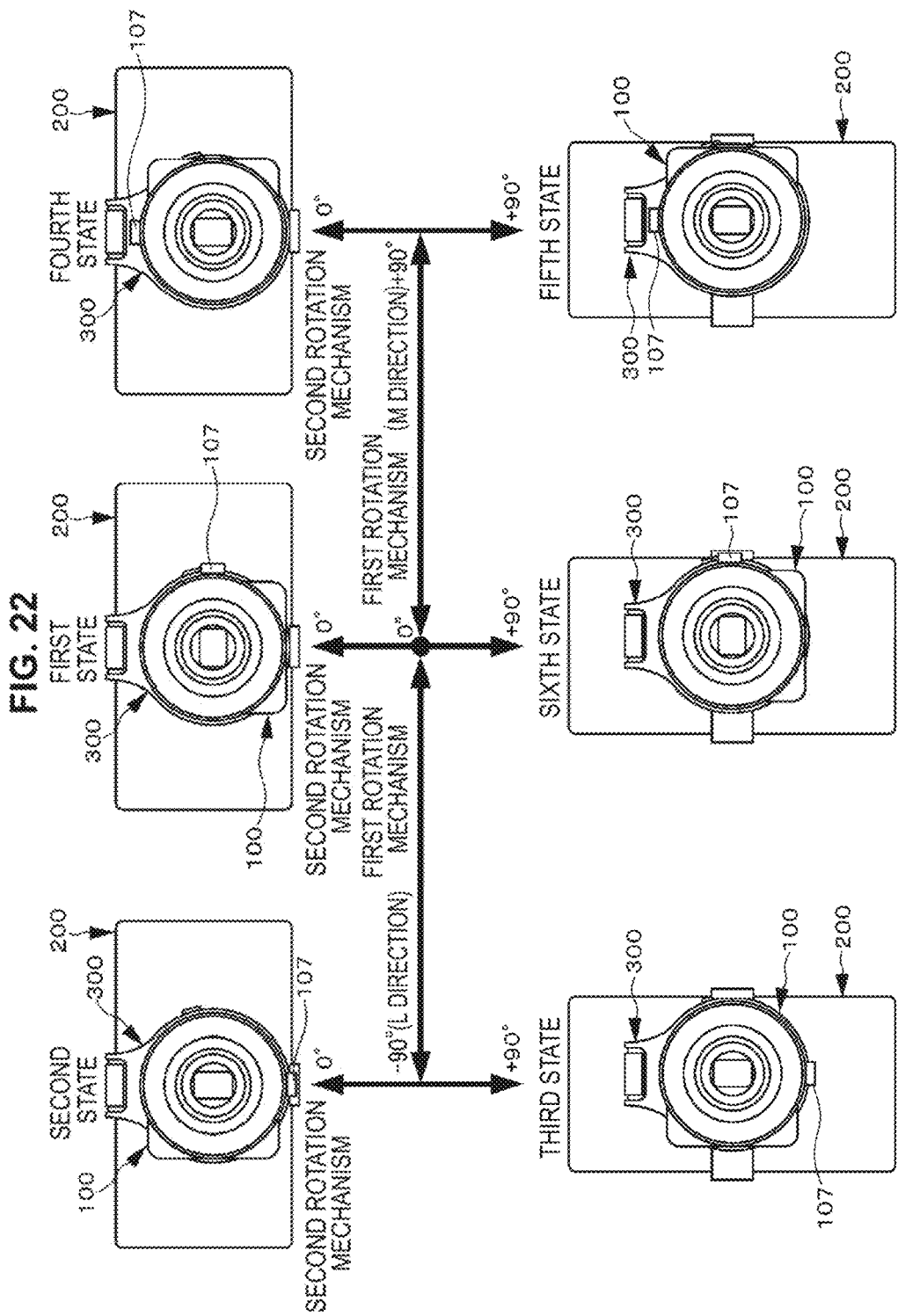
FIG. 22 is a diagram showing states of an imaging device and an information processing device implemented by operation of a mounting device.

FIG. 22 is a diagram showing a different diagram of a transition relation among the above-described first to sixth states. FIG. 22 shows a state in which the third rotation mechanism in the hinge mechanism 330 is closed. In the first state, the information processing device 200 is in a horizontal state, and the input unit 107 of the imaging device 100 is positioned on the right side. First, the state changes from the first state to the second state when the first mounting portion 310 serving as the first rotation mechanism is rotated −90 degrees in the L direction. In the second state, the input unit 107 of the imaging device 100 is positioned on the lower side.

The second state transitions to the third state when the second rotation mechanism is rotated 90 degrees. In the third state, the information processing device 200 is in a vertical state. In the third state, the input unit 107 of the imaging device 100 is positioned on the lower side.

The third state transitions to the sixth state when the first rotation mechanism is rotated 90 degrees (is rotated +90 degrees and returns to the state of 0 degrees) in the M direction. In the sixth state, the input unit 107 of the imaging device 100 is positioned on the right side.

On the other hand, the state changes from the first state to the fourth state when the first mounting portion 310 serving as the first rotation mechanism is rotated +90 degrees in the M direction. In the fourth state, the input unit 107 of the imaging device 100 is positioned on the upper side.

The fourth state transitions to the fifth state when the second rotation mechanism is rotated 90 degrees, in the fifth state, the information processing device 200 is in a vertical state. In the fifth state, the input unit 107 of the imaging device 100 is positioned on the upper side.

The fifth state transitions to the sixth state when the first rotation mechanism is rotated 90 degrees (is rotated −90 degrees and returns to the state of 0 degrees) in the L direction. In the sixth state, the input unit 107 of the imaging device 100 is positioned on the right side.

The first state also transitions to the sixth state when the second rotation mechanism is rotated 90 degrees. In this manner, when the first rotation mechanism and the second rotation mechanism operate, the imaging device 100 and the information processing device 200 can transition to a total of six states.

Figure 23:
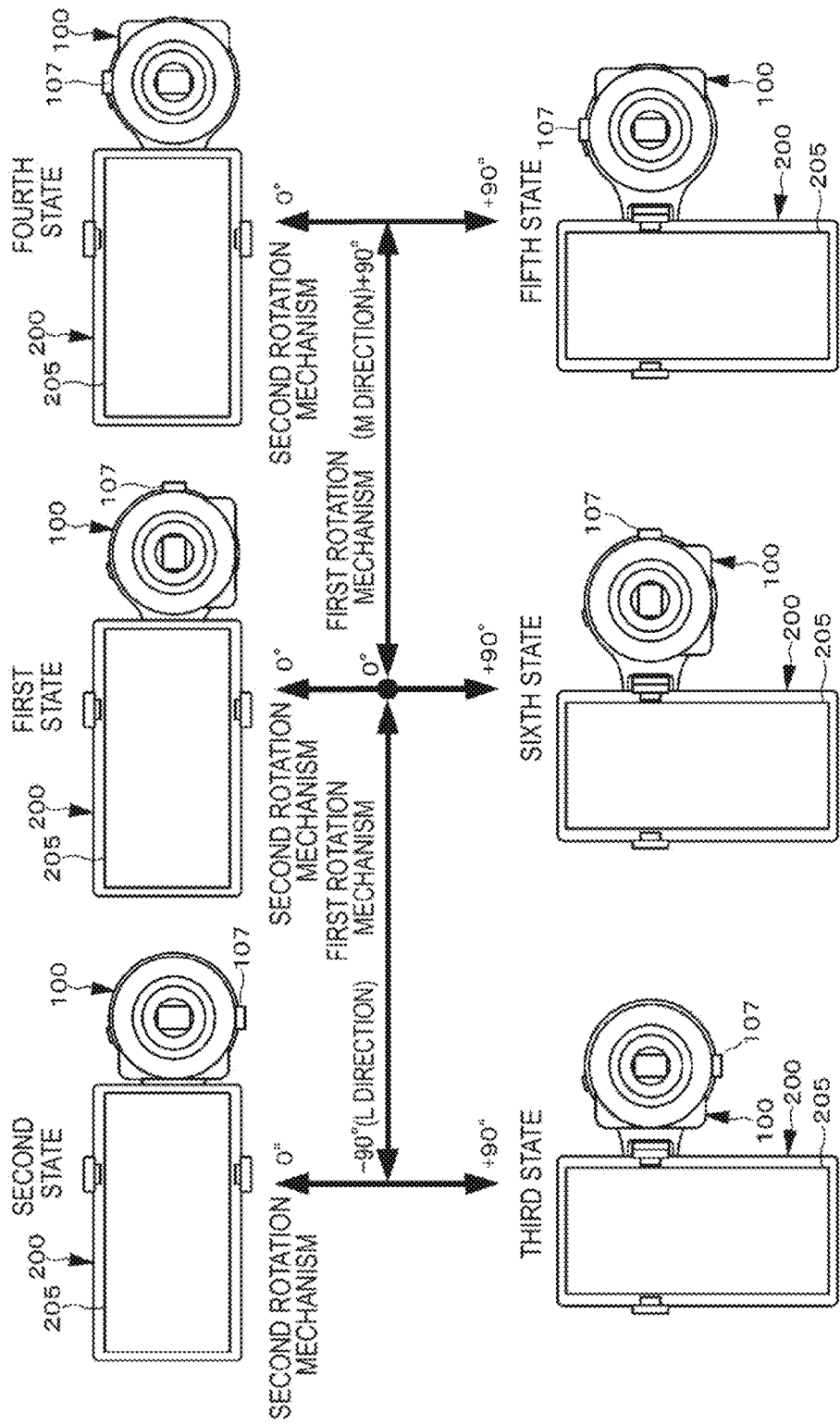
FIG. 23 is a diagram showing states of an imaging device and an information processing device implemented by operation of a mounting device.

FIG. 23 is a diagram showing a different diagram of a transition relation among the first to sixth states when the third rotation mechanism in the hinge mechanism 330 is open. In the first state, the information processing device 200 is in a horizontal state, and the imaging device 100 is positioned on the short side of the information processing device 200. In addition, the input unit 107 of the imaging device 100 is positioned on the right side. First, the state changes from the first state to the second state when the first mounting portion 310 serving as the first rotation mechanism is rotated −90 degrees in the L direction. In the second state, the input unit 107 of the imaging device 100 is positioned on the lower side.

The second state transitions to the third state when the second rotation mechanism is rotated 90 degrees. In the third state, the information processing device 200 is in a vertical state. In the third state, the imaging device 100 is positioned on the long side of the information processing device 200. In addition, the input unit 107 of the imaging device 100 is positioned on the lower side.

The third state transitions to the sixth state when the first rotation mechanism is rotated 90 degrees (is rotated +90 degrees and returns to the state of 0 degrees) in the M direction. In the sixth state, the imaging device 100 is positioned on the long side of the information processing device 200, and the input unit 107 of the imaging device 100 is positioned on the right side.

On the other hand, the state changes from the first state to the fourth state when the first mounting portion 310 serving as the first rotation mechanism is rotated +90 degrees in the M direction. In the fourth state, the imaging device 100 is positioned on the short side of the information processing device 200 and the input unit 107 of the imaging device 100 is positioned on the upper side.

The fourth state transitions to the fifth state when the second rotation mechanism is rotated 90 degrees. In the fifth state, the information processing device 200 is in a vertical state. In the fifth state, the imaging device 100 is positioned on the long side of the information processing device 200 and the input unit 107 of the imaging device 100 is positioned on the upper side.

The fifth state transitions to the sixth state when the first rotation mechanism is rotated 90 degrees (is rotated −90 degrees and returns to the state of 0 degrees) in the L direction. In the sixth state, the imaging device 100 is positioned on the long side of the information processing device 200, and the input unit 107 of the imaging device 100 is positioned on the right side.

The first state also transitions to the sixth state when the second rotation mechanism is rotated 90 degrees. In this manner, when the first rotation mechanism and the second rotation mechanism operate, the imaging device 100 and the information processing device 200 can transition to a total of six states even when the hinge mechanism is open.

Next, cases in which various imaging techniques such as a vertical selfie, horizontal selfie, high angle imaging, and low angle imaging are performed in any of the above-described first to sixth states will be described.

Figure 24:
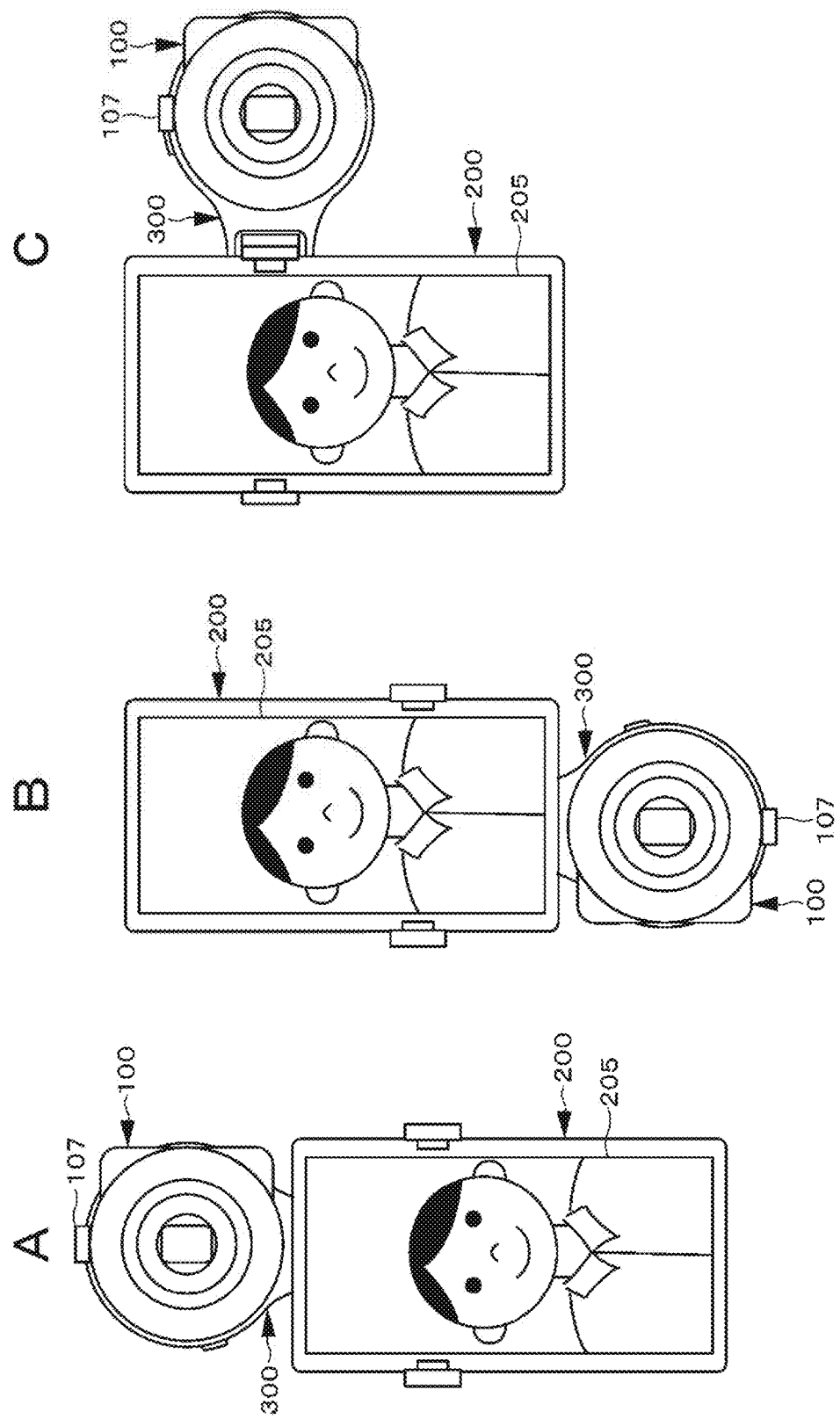
FIG. 24A is a diagram showing a first example of a state of an imaging device and an information processing device when a vertical selfie is performed.
FIG. 24B is a diagram showing a second example of a state of an imaging device and an information processing device when a vertical selfie is performed.
FIG. 24C is a diagram showing a third example of a state of an imaging device and an information processing device when a vertical selfie is performed.

FIG. 24 is a diagram showing a state of the imaging device 100 and the information processing device 200 in a vertical selfie. The vertical selfie is an imaging technique in which the user supports the information processing device 200 in a vertical state and captures his or her own photo with the lens of the imaging device 100 facing the user himself or herself. FIG. 24A shows a state in which the information processing device is set to be supported in a vertical state in the first state shown in FIG. 23. The imaging device 100 is positioned above the short side of the information processing device 200.

In addition, FIG. 24B shows a state obtained by supporting the first state shown in FIG. 23 such that the state of the information processing device becomes a vertical state and the imaging device 100 is positioned below the short side of the information processing device 200. Further, FIG. 24C corresponds to the fifth state shown in FIG. 23. The imaging device 100 is positioned next to the long side of the information processing device 200.

In any state, since the information processing device 200 is in a vertical state, the display unit 205 of the information processing device 200 is also in a vertical state. In addition, the imaging device 100 is in a state in which the input unit 107 is positioned in a vertical direction and an image acquired by capturing is in a vertical orientation. Therefore, the through image and the captured image are those displayed on the display unit 205 of FIG. 24A, FIG. 24B, and FIG. 24C. According to the imaging style shown in FIG. 24, the user can obtain a selfie image of a vertical orientation with the lens of the imaging device 100 facing himself or herself.

Figure 25:
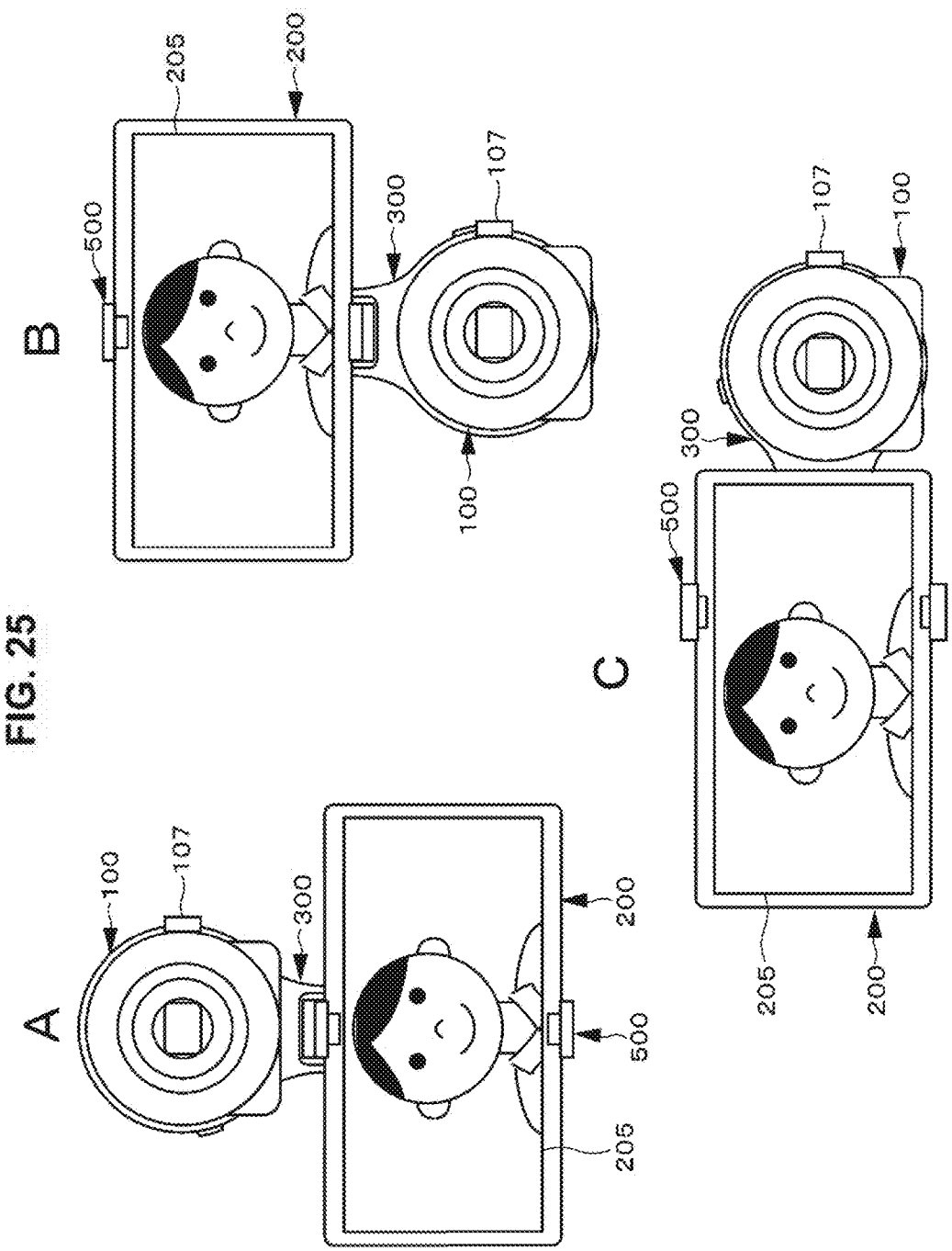
FIG. 25A is a diagram showing a first example of a state of an imaging device and an information processing device when a horizontal selfie is performed.
FIG. 25B is a diagram showing a second example of a state of an imaging device and an information processing device when a horizontal selfie is performed.
FIG. 25C is a diagram showing a third example of a state of an imaging device and an information processing device when a horizontal selfie is performed.

FIG. 25 is a diagram showing a state of the imaging device 100 and the information processing device 200 in a horizontal selfie. The horizontal selfie is an imaging technique in which the user supports the information processing device 200 in a horizontal state and captures his or her own photo with the lens of the imaging device 100 facing the user himself or herself. FIG. 25A shows a state obtained by supporting the third state shown in FIG. 23 such that the state of the information processing device 200 becomes a horizontal state and the imaging device 100 is positioned on the upper long side of the information processing device 200.

When the first rotation mechanism is rotated, the imaging device 100 is in a state in which the input unit 107 is positioned on the right side. Accordingly, the through image of the imaging device 100 and the image acquired by capturing are in a lateral orientation. Accordingly, in the state of FIG. 25A, a lateral direction through image is displayed on the display unit 205 in a lateral direction. According to the imaging style shown in FIG. 25A, the user can obtain a selfie image of a lateral orientation with the lens of the imaging device 100 facing himself or herself.

In addition, FIG. 25B shows a state obtained by supporting the fifth state shown in FIG. 23 such that the state of the information processing device 200 becomes a horizontal state and the imaging device 100 is positioned on the lower long side of the information processing device 200.

In this state, when the first rotation mechanism is rotated, the state of the imaging device 100 becomes a state in which the input unit 107 is positioned on the right side. Accordingly, the through image of the imaging device 100 and the image acquired by capturing are in a lateral orientation. Accordingly, in the state of FIG. 25B, a lateral direction through image is displayed on the display unit 205 in the lateral direction. According to the imaging style shown in FIG. 25B, the user can obtain a selfie image of a lateral orientation with the lens of the imaging device 100 facing himself or herself.

Further, FIG. 25C shows a state in which the information processing device 200 and the imaging device 100 are supported in the first state shown in FIG. 23. In this state, the state of the imaging device 100 becomes a state in which the input unit 107 is positioned on the right side. Accordingly, the through image of the imaging device 100 and the image acquired by capturing are in a lateral orientation. Accordingly, in the state of FIG. 25C, a lateral direction through image is displayed on the display unit 205 in the lateral direction. According to the imaging style shown in FIG. 25C, the user can obtain a selfie image of a lateral orientation with the lens of the imaging device 100 facing himself or herself.

In the states of FIG. 25A, FIG. 25B, and FIG. 25C, all positions of the imaging device 100 with respect to the information processing device 200 are different. However, when the first rotation mechanism serving as rotation of the first mounting portion 310 in the L and M directions is rotated, it is possible to switch the input unit 107 of the imaging device 100. Therefore, even if the imaging device 100 is positioned above or below the information processing device 200, the input unit 107 can be positioned at the same position (a position on the right side). Accordingly, even if the position of the imaging device 100 is changed, it is possible to maintain a manipulation sensation without changing a position of the input unit 107.

Figure 26:
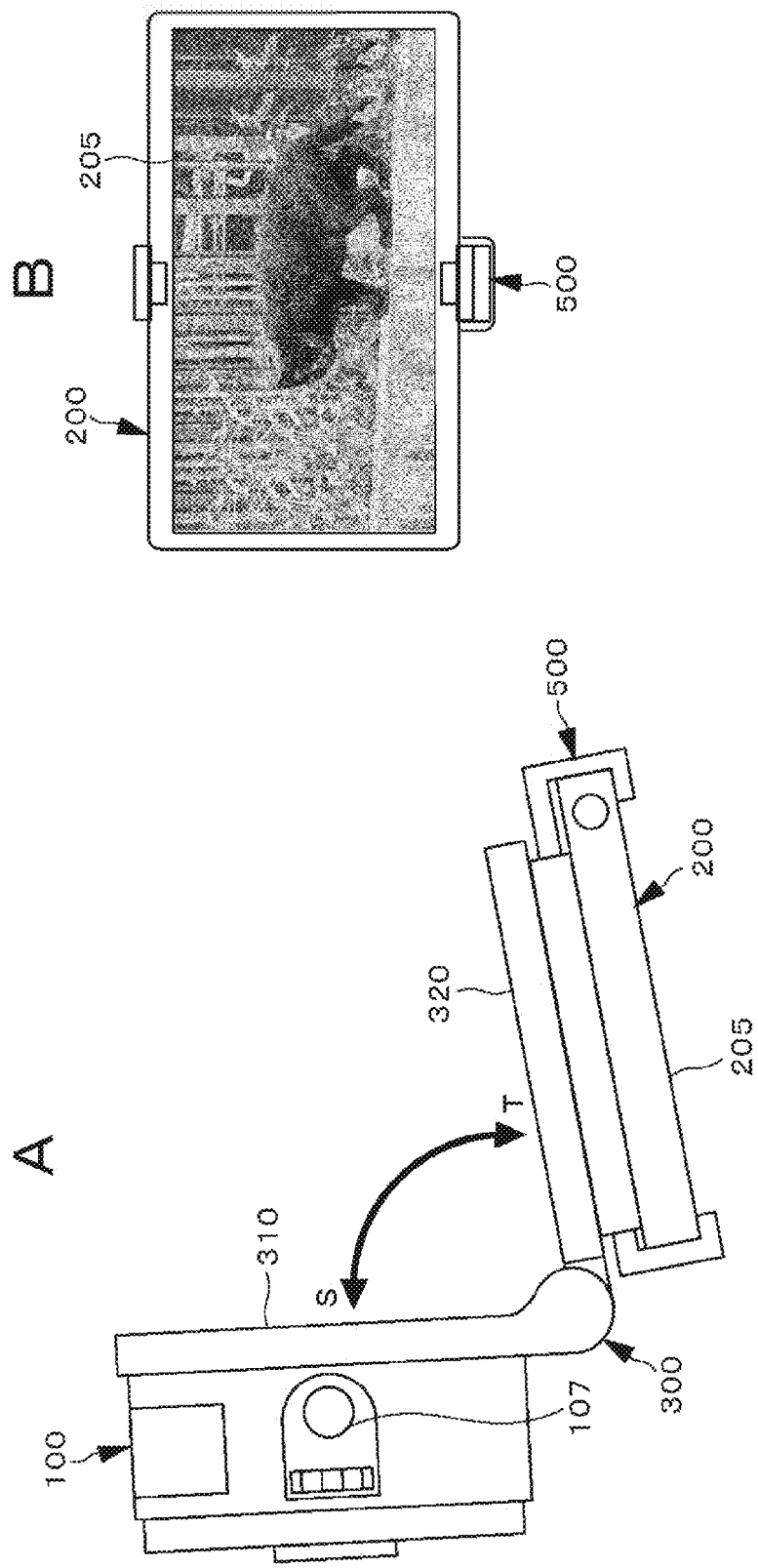
FIG. 26A is a diagram showing a state of an imaging device and an information processing device when high angle imaging is performed.
FIG. 26B is a diagram showing a display example of a display unit when high angle is performed.

FIG. 26 is a diagram showing a state of the imaging device 100 and the information processing device 200 in high angle imaging. As shown in FIGS. 18C, 18D, and 18E, the high angle imaging is an imaging technique in which the user holds the imaging device 100 up, checks a through image using the display unit 205 of the information processing device 200 that faces downward, and then performs imaging.

FIG. 26A is a side view of a state obtained by supporting the third state shown in FIG. 23 such that the state of the information processing device 200 becomes a horizontal state and the imaging device 100 is positioned on the upper long side of the information processing device 200. In addition, the state of FIG. 26A is a state in which the third rotation mechanism serving as rotation of the hinge mechanism in the S and T directions is open within the range of 0 degrees to about 90 degrees.

The imaging device 100 is in a state in which the input unit 107 of the imaging device 100 is positioned on the right side surface side. Accordingly, the through image of the imaging device 100 and the image acquired by capturing are in a lateral orientation. Accordingly, in the state of FIG. 26A, as shown in FIG. 26B, a lateral orientation through image is displayed on the display unit 205 of a lateral orientation. According to the imaging style shown in FIG. 26, the user can perform high angle imaging through which a lateral orientation image is acquired.

Figure 27:
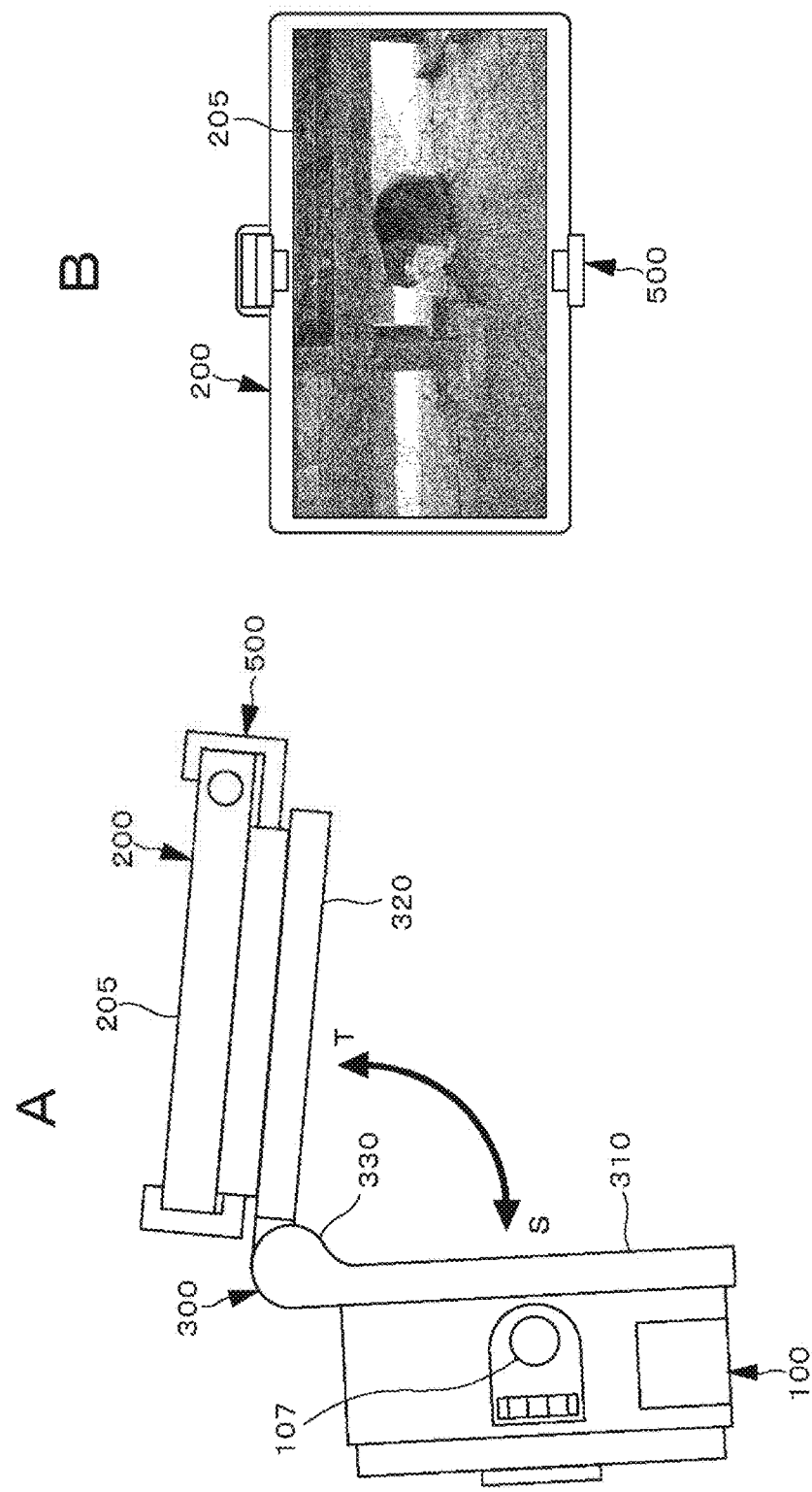
FIG. 27A is a diagram showing states of an imaging device and an information processing device when low angle imaging is performed.
FIG. 27B is a diagram showing a display example of a display unit when low angle is performed.

FIG. 27 is a diagram showing a state of the imaging device 100 and the information processing device 200 in low angle imaging. As shown in FIG. 19C, FIG. 19D, and FIG. 19E, the low angle imaging is an imaging technique in which the user holds the imaging device 100 down, checks a through image using the display unit 205 of the information processing device 200 that faces upward, and then performs imaging.

FIG. 27A is a side view of a state obtained by supporting the fifth state shown in FIG. 23 such that the state of the information processing device 200 becomes a horizontal state, and the imaging device 100 is positioned on the upper long side of the information processing device 200. In addition, the state of FIG. 27A is a state in which the third rotation mechanism serving as rotation of the hinge mechanism in the S and T directions is open within the range of 0 degrees to about 90 degrees.

The imaging device 100 is in a state in which the input unit 107 of the imaging device 100 is positioned on the right side. Accordingly, the through image of the imaging device 100 and the image acquired by capturing are in a lateral orientation. Accordingly, in the state of FIG. 27A, as shown in FIG. 27B, a lateral orientation through image is displayed on the display unit 205 of a lateral orientation. According to the imaging style shown in FIG. 27, the user can perform low angle imaging through which a lateral orientation image is acquired.

In the present embodiment, a manipulation indicator is provided to facilitate use of the mounting device 300. The manipulation indicator will be described with reference to FIG. 28 and FIG. 29. FIG. 28A, FIG. 28B and FIG. 28C are diagrams showing a side surface of the mounting device 300. FIG. 29A is a side view of the mounting device 300. FIG. 29B is a plan view of the mounting device 300 and is a diagram showing a position of a manipulation indicator 430 in order to describe a manipulation indicator provided on a side surface of the mounting device 300.

A notch portion 341 is provided on a side surface of a frame body, and a pan of the first mounting; portion 310 is exposed from the notch portion. The manipulation indicator includes a first manipulation indicator 410 and a second manipulation indicator 420 indicating a direction in which the first mounting portion 310 is rotatable, and the third manipulation indicator 430 indicating a rotation position of the second rotation mechanism serving as rotation of the hinge mechanism.

On a side surface of the first mounting portion 310, a first manipulation indicator 410a, a first manipulation indicator 410b, and a first manipulation indicator 410c are provided to correspond to positions of 0 degrees, +90 degrees, and −90 degrees, respectively, which are positions at which rotation of the first mounting portion 310 serving as the first rotation mechanism is locked. As shown in FIG. 28B, in the manipulation indicator 410a at a position of 0 degrees, since the first mounting portion 310 is rotatable both in a direction of +90 degrees and a direction of −90 degrees, two triangles with vertices facing each other are provided in left and right directions. When the user views such an indicator, he or she can easily understand that the first mounting portion 310 is currently in a state in which it is rotatable both in a direction of +90 degrees and a direction of −90 degrees.

In addition, in a state in which the first mounting portion 310 is rotated in a direction of +90 degrees, a manipulation indicator 412 shown in FIG. 28A is presented. Since the first mounting portion 310 is in a state in which it is rotated in a direction of +90 degrees, the first mounting portion 310 is able to rotate only in a direction of 0 degrees. Therefore, in the first manipulation indicator 410b, one triangle indicating a direction of 0 degrees is shown. When the user views such an indicator, he or she can easily understand that the first mounting portion 310 is currently in a state in which it is rotatable only in a direction of 0 degrees.

Further, in a state in which the first mounting portion 310 is rotated in a direction of −90 degrees, a manipulation indicator 411 shown in FIG. 28C is presented. Since the first mounting portion 310 is in a state in which it is rotated in a direction of −90 degrees, the first mounting portion 310 is able to rotate only in a direction of 0 degrees. Therefore, in the first manipulation indicator 419c, one triangle indicating a direction of 0 degrees is shown. The first manipulation indicator 410c is shown in a direction opposite to that of the first manipulation indicator 410a of FIG. 28A. When the user views such an indicator, he or she can easily understand that the first mounting portion 310 is currently in a state in which it is rotatable only in a direction of 0 degrees.

In addition, the second manipulation indicator 412 having a straight line shape indicating that rotation is performed in a horizontal direction with respect to the first mounting portion 310 is shown in the above-described three manipulation indicators.

In addition, as the third manipulation indicator 430 adjacent to the first manipulation indicator 410 shown on a side surface of the first mounting portion 310, a first circle having a filled inside and a second circle having an unfilled inside are shown. Similarly, a first circle having a tilled inside and a second circle having an unfilled inside are shown on a side surface of the second mounting portion 320 as the third manipulation indicator 430. A state in which the same circles are arranged in a vertical direction is the state of 0 degrees of the second rotation mechanism serving as rotation of the hinge mechanism 330. A state in which different circles are arranged in a vertical state indicates a state in which the second rotation mechanism is rotated 90 degrees.

Next, settings of rotation torque of the first rotation mechanism, the second rotation mechanism and the third rotation mechanism will be described. First, the first rotation mechanism serving as rotation of the first mounting portion 310 will be described. In the first rotation mechanism, in a state in which only the imaging device 100 mounted on the first mounting portion 310 is supported by hand, rotation torque is set to prevent the first rotation mechanism from being rotated due to a weight of the information processing device 200 and the information processing device 200 from moving accordingly. Accordingly, it is possible to prevent the first rotation mechanism from being rotated accidentally and the information processing device 300 from being rotated.

Next, the second rotation mechanism serving, as rotation of the hinge mechanism 330 with respect to the second mounting portion 320 will be described. In the second rotation mechanism, in a state in which the hinge portion 333 is open and the user supports only the imaging device 100 by hand, rotation torque is set to prevent the second rotation mechanism from being rotated due to a weight of the information processing device 200 and the information processing device 200 from moving accordingly. Accordingly, it is possible to prevent the second rotation mechanism from being rotated accidentally and the information processing device 200 from being rotated.

Further, in the third rotation mechanism serving as rotation of the hinge portion 333 of the hinge mechanism 330, when the hinge portion 333 is open and the imaging device 100 is positioned in a vertical direction of the information processing device 200, rotation torque is set to prevent the third rotation mechanism from being rotated due to a weight of the information processing device 200 in a state in which only the imaging device 100 is supported by hand. Accordingly, it is possible to prevent the third rotation mechanism from being rotated accidentally.

Since the first rotation mechanism and the second rotation mechanism have the same rotation center, when the rotation torque is the same, there is a risk of the second rotation mechanism being erroneously rotated when rotation of the first rotation mechanism is attempted or vice versa. Further, there is a risk of the user being unable to know whether the first rotation mechanism or the second rotation mechanism is rotated. Therefore, by setting a difference between the rotation torque of the first rotation mechanism and the rotation torque of the second rotation mechanism, it is possible to distinguish the first rotation mechanism and the second rotation mechanism. Accordingly, it is possible to prevent an unintended rotation mechanism from being erroneously rotated and it is possible for the user to easily recognize which rotation mechanism is rotated.

In the first rotation mechanism and the second rotation mechanism, since a frequency of use of the first rotation mechanism through which only the imaging device 100 is rotated is considered to be high, the rotation torque of the first rotation mechanism may be set to be smaller than the rotation torque of the second rotation mechanism. Accordingly, it is possible to reduce a burden on the user's manipulation. However, this description is not intended to exclude a case in which the rotation torque of the first rotation mechanism is set to be greater than the rotation torque of the second rotation mechanism.

Setting of the rotation torque in the first rotation mechanism and the second rotation mechanism can be performed by, for example, adjusting a spring force of a spring of the click mechanism. Setting of the rotation torque in the third rotation mechanism can be performed by adjusting a degree of frictional resistance of the hinge portion 333.

The mounting device according to the present embodiment can be operated as described above. According to the present technology, when the imaging device 100 is mounted on another device and used, it is possible to change a position and an orientation of the imaging device 100. Therefore, it is possible to easily perform imaging at various imaging positions with various imaging techniques.

Figure 30:
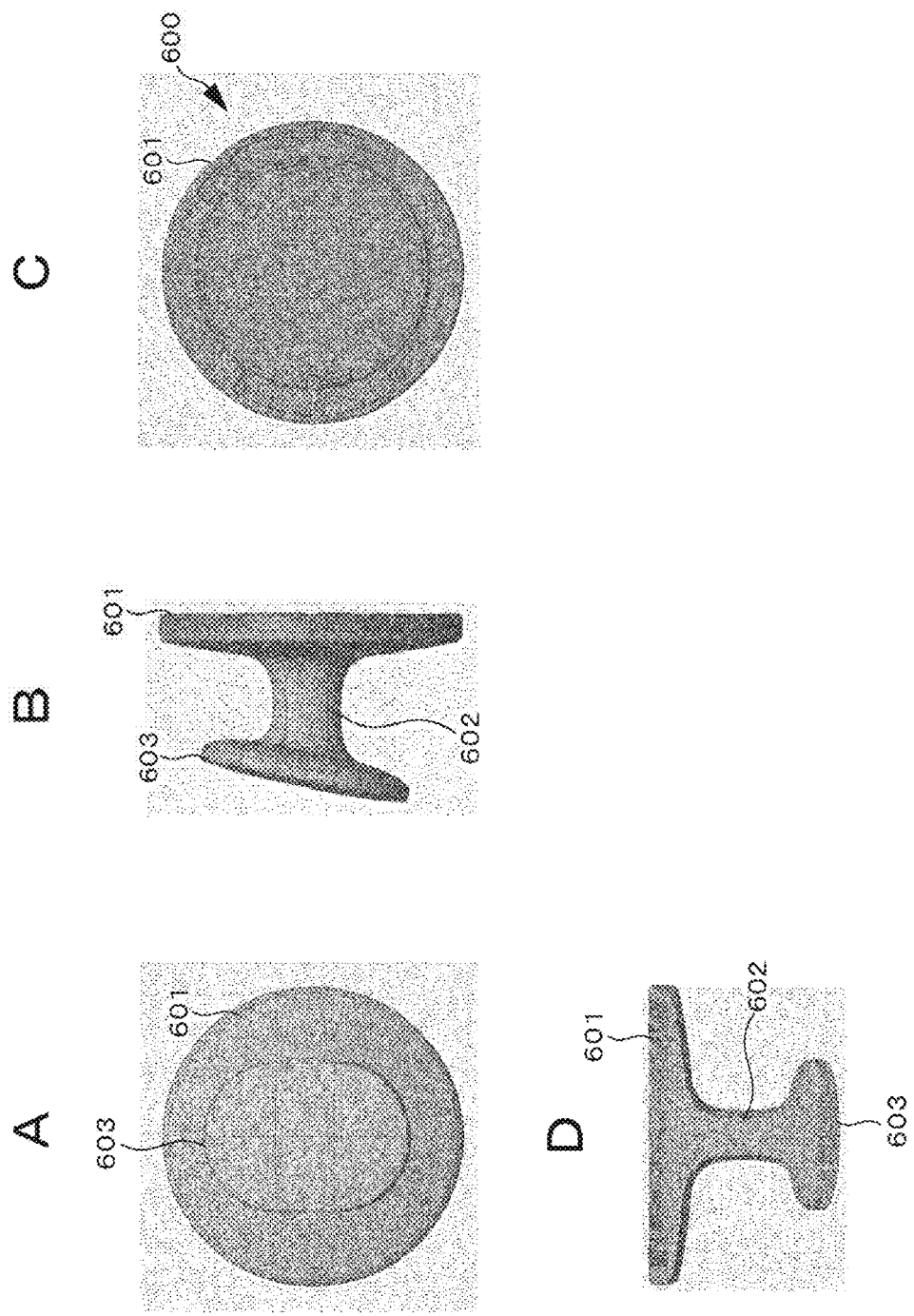
FIG. 30A is a rear view of a handheld device.
FIG. 30B is a side view of a handheld device.
FIG. 30C is a front view of a handheld device.
FIG. 30D is a plan view of a handheld device.

A device other than the information processing device 200 can also be mounted on the second mounting portion 320. The device other than the information processing device 200 includes a support device configured to support the imaging device 100 such as a camera platform device or a handheld device. FIG. 30 shows an exemplary handheld device. A handheld device 600 includes a mounting portion 604 for mounting the imaging device 100, a handle portion 602 held in the user's hand, and an engaging portion 603 on which a hand gripping the handle portion is caught. The mounting portion 601 has the same configuration as the mounting surface of the first mounting portion of the mounting device 300. The handheld device 600 is made of rubber and can prevent the user's hand from slipping. In addition, it is possible to reduce a manufacturing cost according to the provision of one component.

Figure 31:
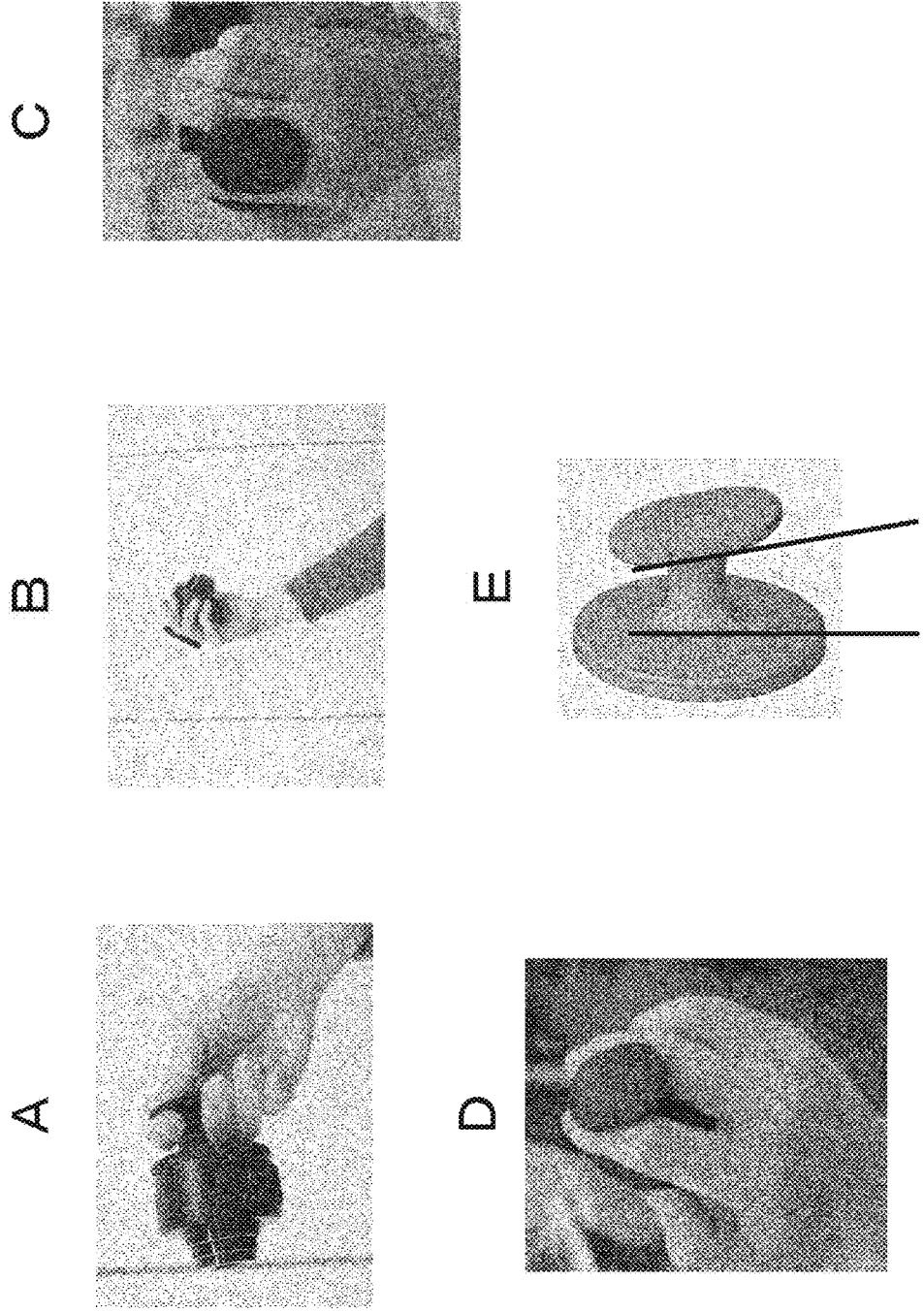
FIG. 31A, FIG. 31B, FIG. 31C, and FIG. 31D are diagrams showing use states of a handheld device.
FIG. 31E is a diagram for describing a structure of a mounting portion and an engaging portion of a handheld device.

FIG. 31 is a diagram showing a use state of the handheld device 600. As shown in FIG. 31A to FIG. 31D, the handheld device 600 can support a plurality of holding manners and can increase stability of the imaging device 100 when selfie imaging is performed. In addition, as shown in FIG. 31E, since the mounting portion 601 and the engaging portion 603 form the inverted v shape in a side view, it is possible to support various finger thicknesses.

Figure 32:
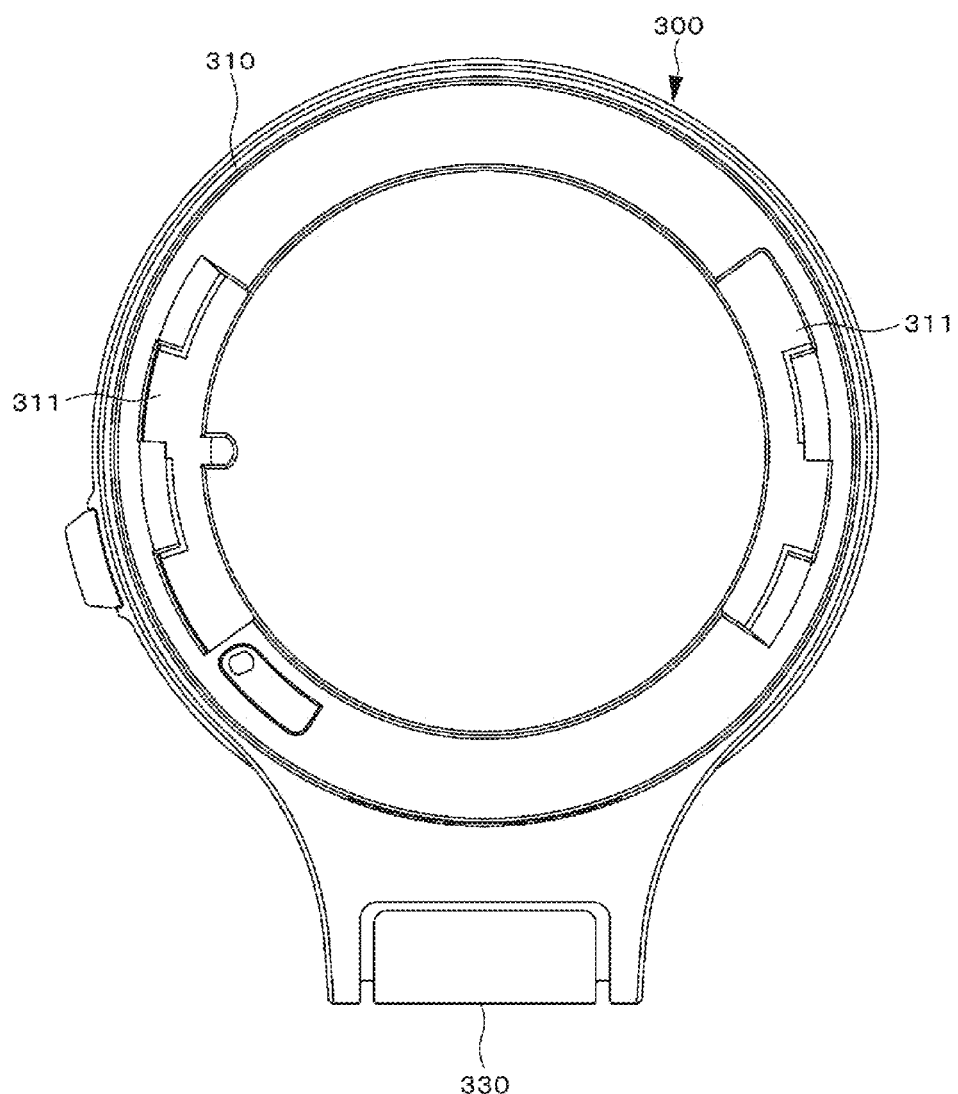
FIG. 32 is a plan view of a first mounting portion side of a mounting device.
Figure 33:
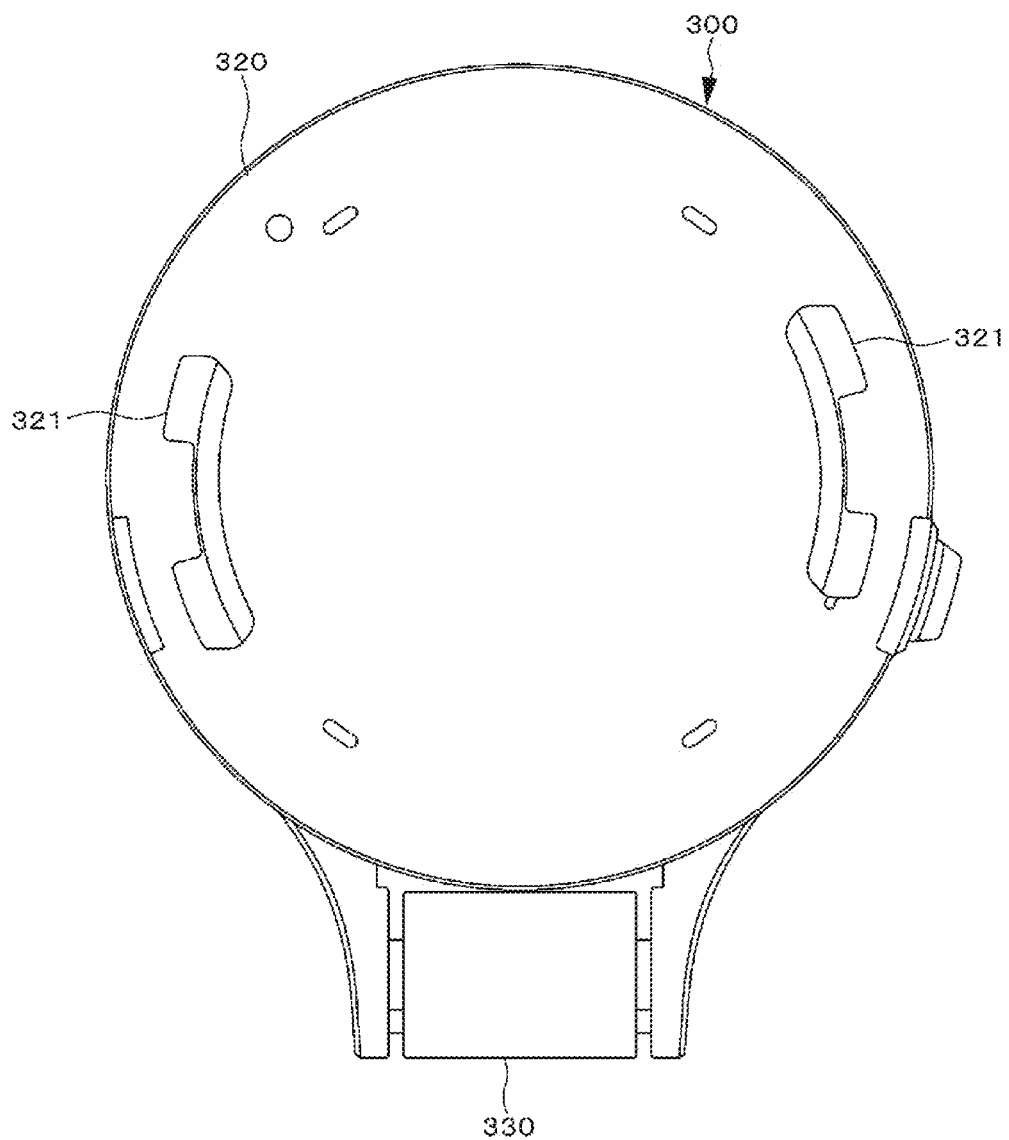
FIG. 33 is a plan view of a second mounting portion side of a mounting device.
Figure 34:
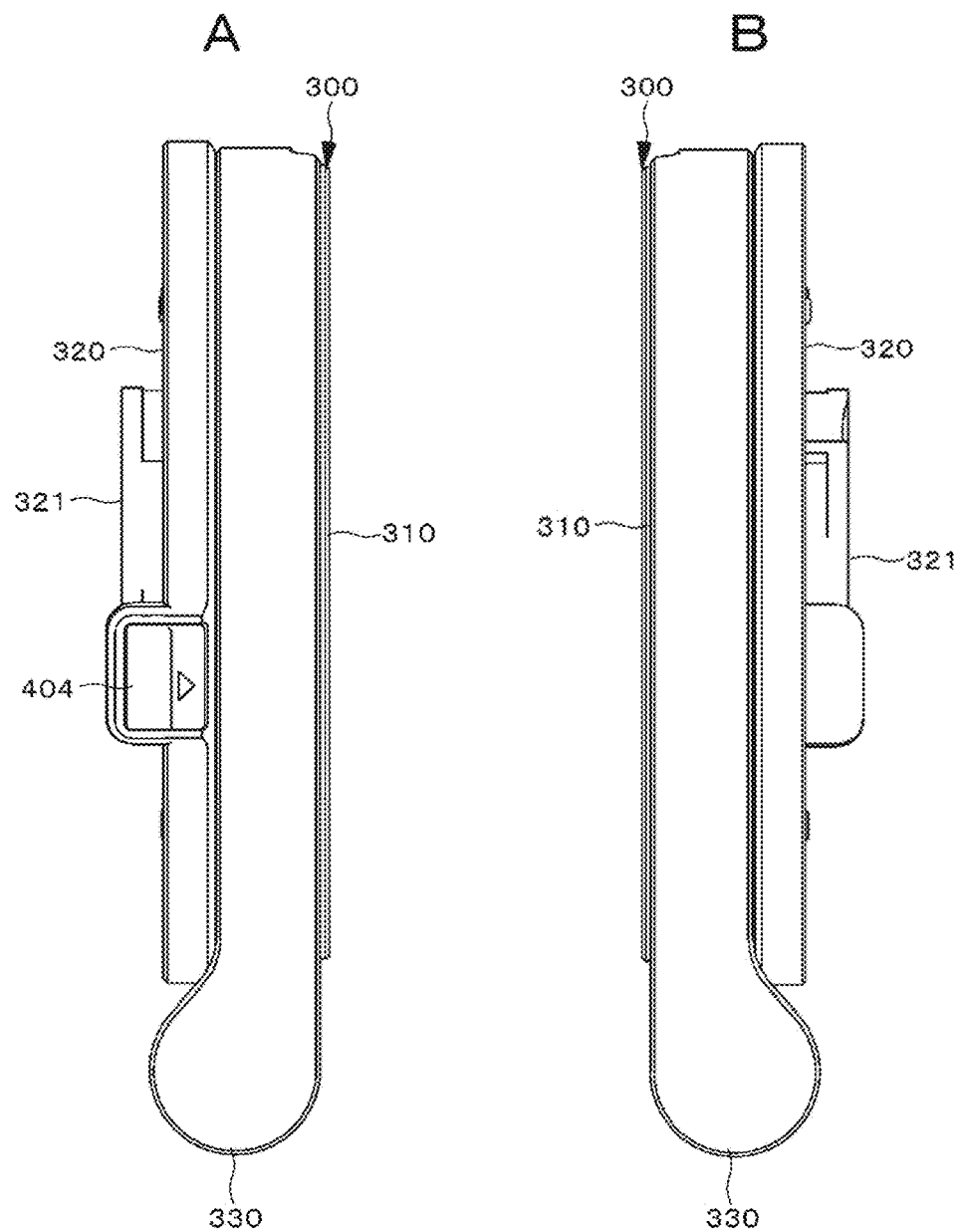
FIG. 34A and FIG. 34B are side views of a mounting device.
Figure 36:
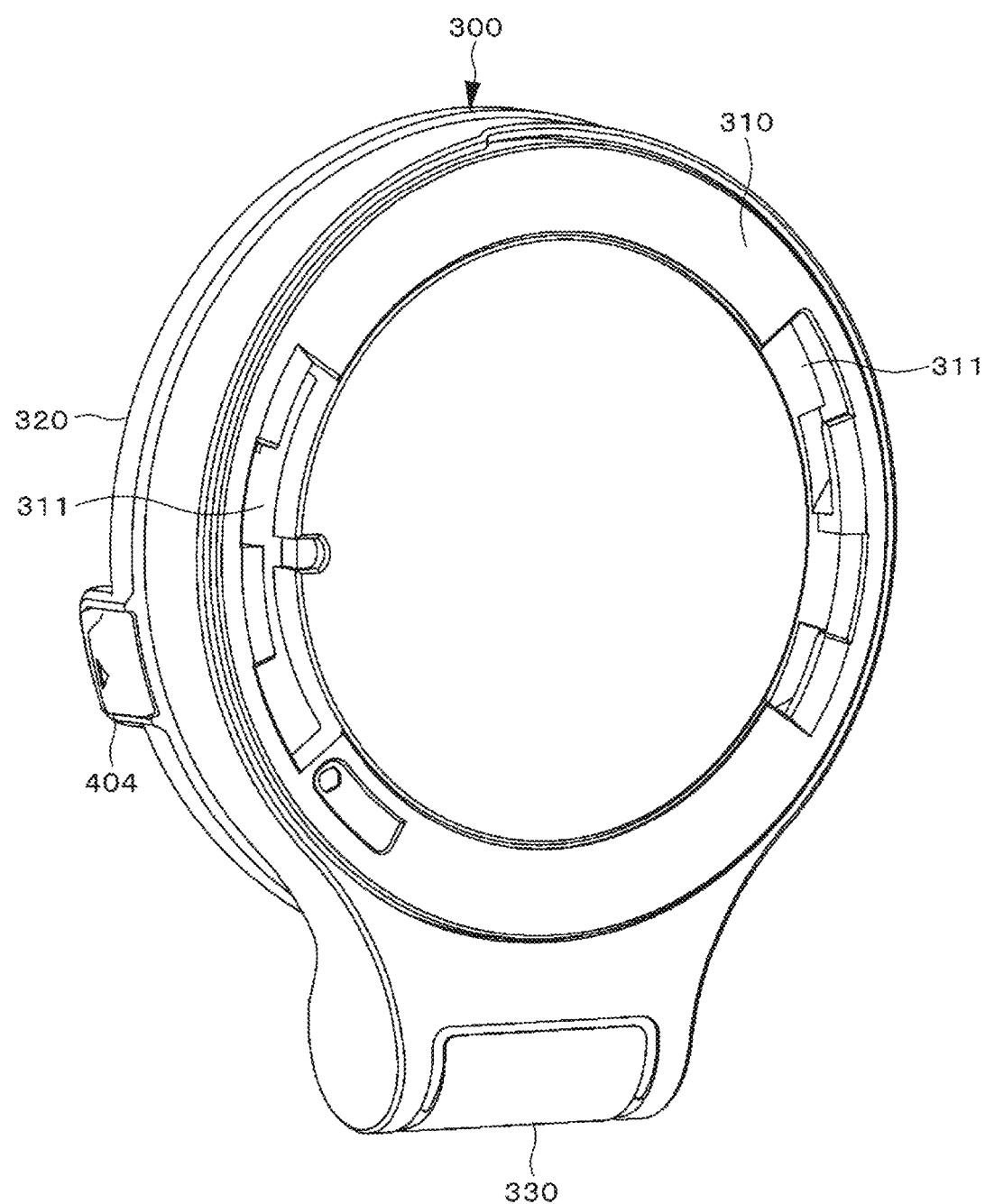
FIG. 36 is a perspective view of a first mounting portion side of a mounting device.
Figure 37:
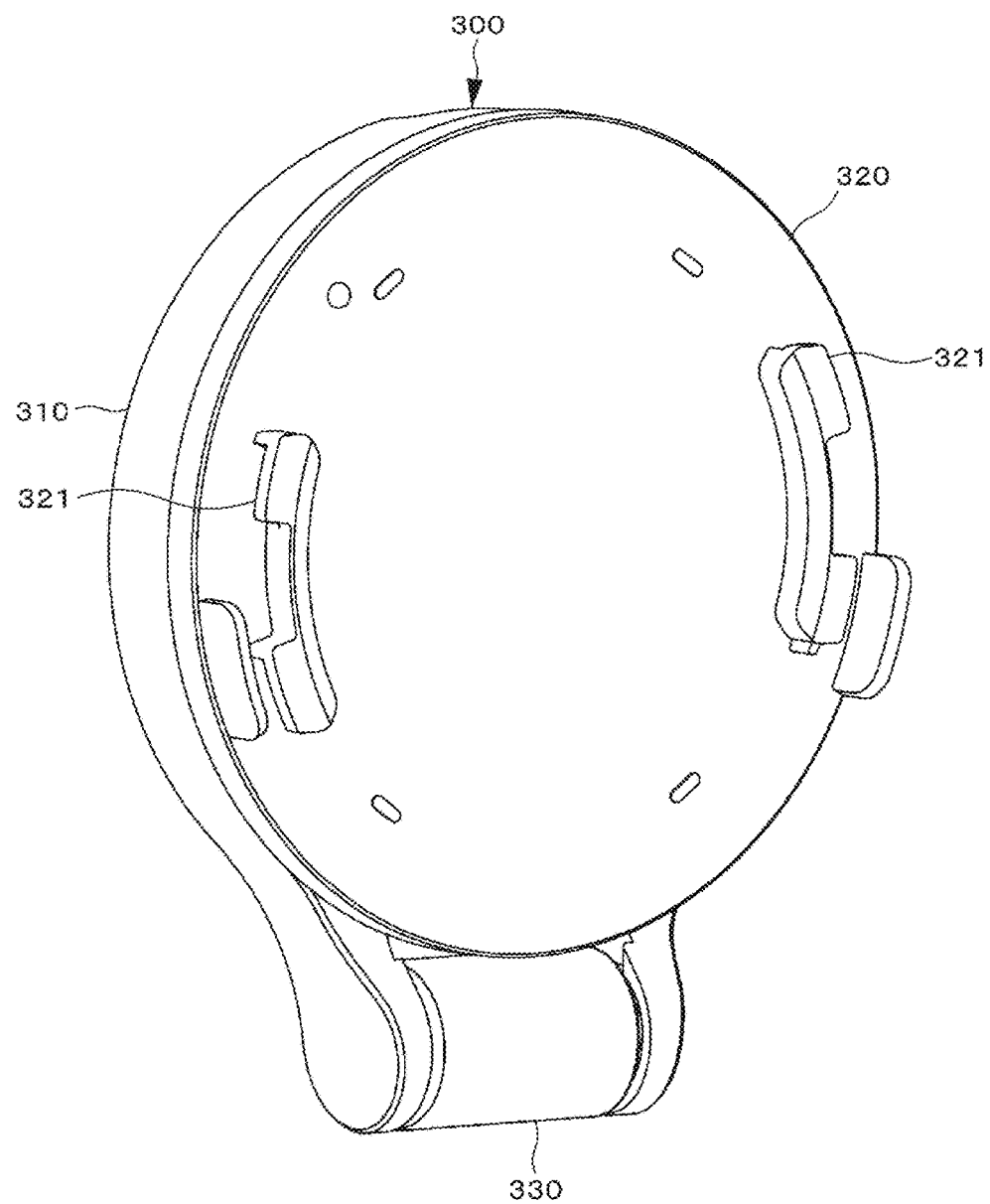
FIG. 37 is a perspective view of a second mounting portion side of a mounting device.
Figure 38:
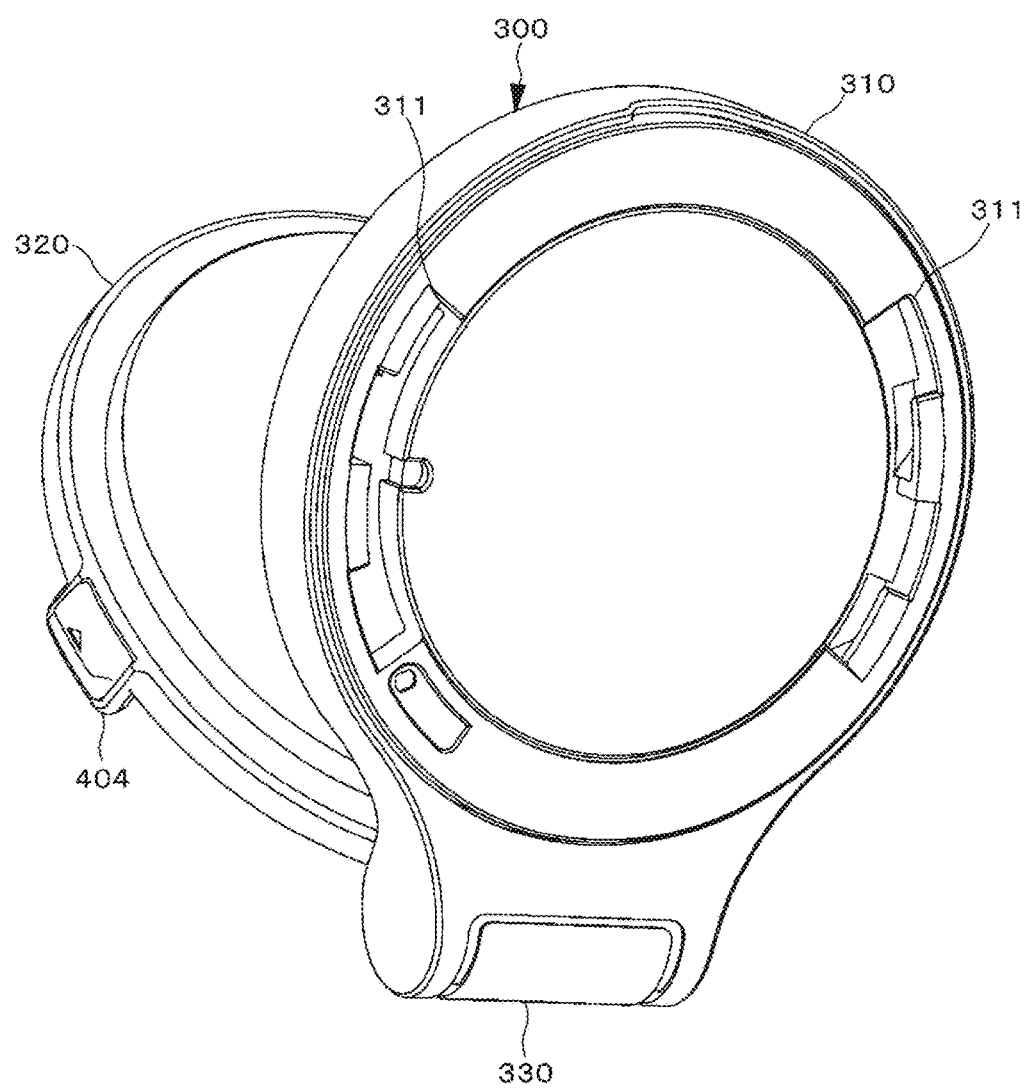
FIG. 38 is a perspective view when a hinge of a mounting device is open.

FIG. 32, FIG. 33, FIG. 34, FIG. 35, FIG. 36, FIG. 37, and FIG. 38 are diagrams showing exteriors of the mounting device 300. FIG. 32 is a plan view of the first mounting portion 310 side of the mounting device 300. FIG. 33 is a plan view of the second mounting portion 320 side of the mounting device 300. FIG. 34A and FIG. 34B are side views of the mounting device 300. FIG. 35A and FIG. 35B are side views of the mounting device 300. FIG. 36 is a perspective view of the first mounting portion 310 side of the mounting device 300. FIG. 37 is a perspective view of the second mounting portion 320 side of the mounting device 300. FIG. 38 is a perspective view when the hinge mechanism 330 of the mounting device 300 is open.

2. MODIFICATION EXAMPLE

The embodiments of the present technology have been specifically described above. However, the present technology is not limited to the above-described embodiments. Various modifications of the present technology can be made without departing from the technical spirit of the present technology. Additionally, the present technology may also be configured as below.

(1)

A mounting device that enables an imaging device configured to transmit an image to an external display device to be detachable from an external device, the mounting device including:

a first mounting portion configured to be mounted on the imaging device;

a second mounting portion configured to be mounted on the external device; and a rotation mechanism through which the first mounting portion and the second mounting portion are rotatable.

(2)
The mounting device according to (1),
wherein the rotation mechanism is a first rotation mechanism that is provided in the first mounting portion.
(3)
The mounting device according to (1) or (2),
wherein the rotation mechanism is a second rotation mechanism that is provided in the second mounting portion.
(4)
The mounting device according to claim 1 of (1) to (3),
wherein the rotation mechanism is a third rotation mechanism that is provided between the first mounting portion and the second mounting portion.
(5)
The mounting device according to (1), including:
a first rotation mechanism that is provided in the first mounting portion;
a second rotation mechanism that is provided in the second mounting portion; and
a third rotation mechanism that is provided between the first mounting portion and the second mounting portion.
(6)
The mounting deice according to any of (1) to (5),
wherein the rotation mechanism is rotatable using a connection direction of the imaging device as a rotation center, and rotation torque of the first mounting portion is different from rotation torque of the rotation mechanism using a connection direction of the imaging device as a rotation center.
(7)
The mounting device according to any of (1) to (6),
wherein the rotation torque of the first mounting portion is smaller than rotation torque of the rotation mechanism with respect to the second mounting portion.
(8)
The mounting device according to any of (1) to (7), including
a first indicator indicating a direction in which the first mounting portion is rotatable.
(9)
The mounting device according to any of (1) to (8), including
a second indicator indicating a direction in which the rotation mechanism is rotatable with respect to the second mounting portion.
(10)
The mounting device according to any of (1) to (9), further including
a locking mechanism configured to lock a mounting state of the second mounting portion and the external device.
(11)
The mounting device according to any of (1) to (10), further including
a mounting exclusion mechanism configured to disable mounting of the second mounting portion on another predetermined device.
(12)
The mounting device according to any of (1) to (11),
wherein the external device is mounted on the second mounting portion through an attachment device that is able to be directly connected to the external device.
(13)
The mounting device according to any of (1) to (12),
wherein the external device is the information processing device.
(14)
An imaging unit including:
an imaging portion;
a first mounting portion configured to be mounted on the imaging portion;
a second mounting portion configured to be mounted on an external device; and
a rotation mechanism through which the first mounting portion and the second mounting portion are rotatable.
(15)
The imaging unit according to (14),
wherein the rotation mechanism is a first rotation mechanism that is provided in the first mounting portion.
(16)
The imaging unit according to (14) or (15),
wherein the rotation mechanism is a second rotation mechanism that is provided in the second mounting portion.
(17)
The imaging unit according to any of (14) to (16),
wherein the rotation mechanism is a third rotation mechanism that is provided between the first mounting portion and the second mounting portion.
(18)
The imaging unit according to (14), including:
a first rotation mechanism that is provided in the first mounting portion;
a second rotation mechanism that is provided in the second mounting portion; and
a third rotation mechanism that is provided between the first mounting portion and the second mounting portion.
(19)
The imaging unit according to any of (14) to (18),
wherein the rotation mechanism is rotatable using a connection direction of the imaging device as a rotation center, and rotation torque of the first mounting portion is different from rotation torque of the rotation mechanism using a connection direction of the imaging device as a rotation center.
(20)
The imaging unit according to any of (14) to (19),
wherein the rotation torque of the first mounting portion is smaller than rotation torque of the rotation mechanism with respect to the second mounting portion.

REFERENCE SIGNS LIST 200 information processing device
100 imaging device
300 mounting device
310 first mounting portion
320 second mounting portion
330 hinge mechanism
410 manipulation indicator
400 locking mechanism
450 protrusion portion
500 attachment

The invention claimed is:
1. A mounting device that enables an imaging device configured to transmit an image to an external display device to be detachable from an external device, the mounting device comprising:
a first mounting portion configured to be mounted on the imaging device;
a second mounting portion configured to be mounted on the external device; and a rotation mechanism through which the first mounting portion and the second mounting portion are rotatable; and a mounting exclusion mechanism configured to disable mounting of the second mounting portion on another predetermined device, wherein the rotation mechanism is rotatable using a connection direction of the imaging device as a rotation center, and a rotation torque of the first mounting portion is different from a rotation torque of the rotation mechanism using the connection direction of the imaging device as the rotation center.

2. The mounting device according to claim 1,
wherein the rotation mechanism is a first rotation mechanism that is provided in the first mounting portion.

3. The mounting device according to claim 1,
wherein the rotation mechanism is a second rotation mechanism that is provided in the second mounting portion.

4. The mounting device according to claim 1,
wherein the rotation mechanism is a third rotation mechanism that is provided between the first mounting portion and the second mounting portion.

5. The mounting device according to claim 1, comprising:
a first rotation mechanism that is provided in the first mounting portion;
a second rotation mechanism that is provided in the second mounting portion; and
a third rotation mechanism that is provided between the first mounting portion and the second mounting portion.

6. The mounting device according to claim 1,
wherein the rotation torque of the first mounting portion is smaller than rotation torque of the rotation mechanism with respect to the second mounting portion.

7. The mounting device according to claim 1, comprising
a first indicator indicating a direction in which the first mounting portion is rotatable.

8. The mounting device according to claim 1, comprising
a second indicator indicating a direction in which the rotation mechanism is rotatable with respect to the second mounting portion.

9. The mounting device according to claim 1, further comprising
a locking mechanism configured to lock a mounting state of the second mounting portion and the external device.

10. The mounting device according to claim 1, further comprising
a mounting exclusion mechanism configured to disable mounting of the second mounting portion on another predetermined device.

11. The mounting device according to claim 1,
wherein the external device is mounted on the second mounting portion through an attachment device that is able to be directly connected to the external device.

12. The mounting device according to claim 1,
wherein the external device is the display device.

13. An imaging unit comprising:
an imaging portion;
a first mounting portion configured to be mounted on the imaging portion;
a second mounting portion configured to be mounted on an external device; and
a rotation mechanism through which the first mounting portion and the second mounting portion are rotatable,
wherein the rotation mechanism is rotatable using a connection direction of the imaging device as a rotation center, and a rotation torque of the first mounting portion is different from a rotation torque of the rotation mechanism using the connection direction of the imaging device as the rotation center.

14. The imaging unit according to claim 13,
wherein the rotation mechanism is a first rotation mechanism that is provided in the first mounting portion.

15. The imaging unit according to claim 13,
wherein the rotation mechanism is a second rotation mechanism that is provided in the second mounting portion.

16. The imaging unit according to claim 13,
wherein the rotation mechanism is a third rotation mechanism that is provided between the first mounting portion and the second mounting portion.

17. The imaging unit according to claim 13, comprising:
a first rotation mechanism that is provided in the first mounting portion;
a second rotation mechanism that is provided in the second mounting portion; and
a third rotation mechanism that is provided between the first mounting portion and the second mounting portion.

18. The imaging unit according to claim 13,
wherein the rotation torque of the first mounting portion is smaller than rotation torque of the rotation mechanism with respect to the second mounting portion.

* * * * *